United States Patent
Yatabe et al.

(10) Patent No.: US 9,215,378 B2
(45) Date of Patent: Dec. 15, 2015

(54) DEVICE, METHOD, AND RECORDING MEDIUM FOR SETTING A READOUT METHOD BASED ON A ZOOM SETTING AND IDENTIFIED THRESHOLD VALUE

(75) Inventors: Yusuke Yatabe, Tokyo (JP); Hironori Komi, Tokyo (JP); Kozo Masuda, Tokyo (JP)

(73) Assignee: NEC Corporation, Tokyo (JP)

( * ) Notice: Subject to any disclaimer, the term of this patent is extended or adjusted under 35 U.S.C. 154(b) by 29 days.

(21) Appl. No.: 14/343,311

(22) PCT Filed: Sep. 11, 2012

(86) PCT No.: PCT/JP2012/073184
§ 371 (c)(1),
(2), (4) Date: Oct. 27, 2014

(87) PCT Pub. No.: WO2013/039061
PCT Pub. Date: Mar. 21, 2013

(65) Prior Publication Data
US 2015/0036034 A1    Feb. 5, 2015

(30) Foreign Application Priority Data

Sep. 13, 2011  (JP) ................................. 2011-199992

(51) Int. Cl.
*H04N 5/341* (2011.01)
*H04N 5/232* (2006.01)
(Continued)

(52) U.S. Cl.
CPC ............ *H04N 5/23296* (2013.01); *G03B 7/091* (2013.01); *H04N 5/2351* (2013.01);
(Continued)

(58) Field of Classification Search
CPC ... H04N 5/23296; H04N 5/378; H04N 5/351; H04N 5/347; H04N 5/2351; H04N 5/3454; H04N 5/243; G03B 7/091
See application file for complete search history.

(56) References Cited

U.S. PATENT DOCUMENTS 6,728,428 B1 * 4/2004 Kinjo ............................ 382/309
6,787,749 B1    9/2004 Zhou et al.
(Continued)

FOREIGN PATENT DOCUMENTS

EP          1592236 A1     11/2005
JP       2003-189183         7/2003
(Continued)

OTHER PUBLICATIONS

Extended European Search Report issued by the European Patent Office for Application No. 12832467.0 dated Apr. 21, 2015 (5 pages).
(Continued)

*Primary Examiner* — Nicholas Giles
(74) *Attorney, Agent, or Firm* — Wilmer Cutler Pickering Hale and Dorr LLP

(57) ABSTRACT

An imaging device (100) is provided with: an imager (1) that includes an imaging element with multiple pixels arranged two-dimensionally, and that outputs an image signal in accordance with setting of either a pixel addition readout method or a cutout readout method; a signal processor (2) that processes the image signal from the imager (1); an operator (3) that inputs operation information; a lightness detector (4) that detects a subject lightness; and a controller (5). The controller (5) includes a zoom setter (51) that sets a zoom magnification for a subject based on a zoom signal that is input by the operator (3), and a readout-method switching controller (52) that switches between the pixel addition readout method and the cutout readout method according to the zoom magnification set by the zoom setter (51) and the lightness detected by the lightness detector (4).

10 Claims, 17 Drawing Sheets

(51) Int. Cl.
*H04N 5/347* (2011.01)
*H04N 5/235* (2006.01)
*H04N 5/243* (2006.01)
*H04N 5/345* (2011.01)
*H04N 5/351* (2011.01)
*H04N 5/378* (2011.01)
*G03B 7/091* (2006.01)

(52) U.S. Cl.
CPC .............. *H04N 5/243* (2013.01); *H04N 5/347* (2013.01); *H04N 5/3454* (2013.01); *H04N 5/351* (2013.01); *H04N 5/378* (2013.01)

(56) References Cited

U.S. PATENT DOCUMENTS

| | | | |
|---|---|---|---|
| 7,199,821 B2 * | 4/2007 | Miyao et al. | 348/223.1 |
| 2004/0095485 A1 | 5/2004 | Ueda et al. | |
| 2004/0179134 A1 * | 9/2004 | Tadaki | 348/371 |
| 2005/0270391 A1 | 12/2005 | Watanabe | |
| 2007/0215791 A1 | 9/2007 | Yamamoto | |
| 2009/0185034 A1 * | 7/2009 | Kishida et al. | 348/79 |
| 2009/0225188 A1 * | 9/2009 | Miyao et al. | 348/223.1 |
| 2009/0251577 A1 | 10/2009 | Watanabe | |

FOREIGN PATENT DOCUMENTS

| | | |
|---|---|---|
| JP | 2004-172845 | 6/2004 |
| JP | 2006-261929 | 9/2006 |
| JP | 2006-352610 A | 12/2006 |
| JP | 2007-251343 | 9/2007 |
| JP | 2010-136218 | 6/2010 |

OTHER PUBLICATIONS

International Search Report corresponding to PCT/JP2012/073184, Nov. 26, 2012, 2 pages.

* cited by examiner

CASE1 ; WHEN ZOOM MAGNIFICATION IS LARGER THAN OR EQUAL TO THRESHOLD VALUE OF ZOOM_UP_TH CORRESPONDING TO DETECTED LIGHTNESS
CASE2 ; WHEN ZOOM MAGNIFICATION IS SMALLER THAN OR EQUAL TO THRESHOLD VALUE OF ZOOM_DOWN_TH CORRESPONDING TO DETECTED LIGHTNESS

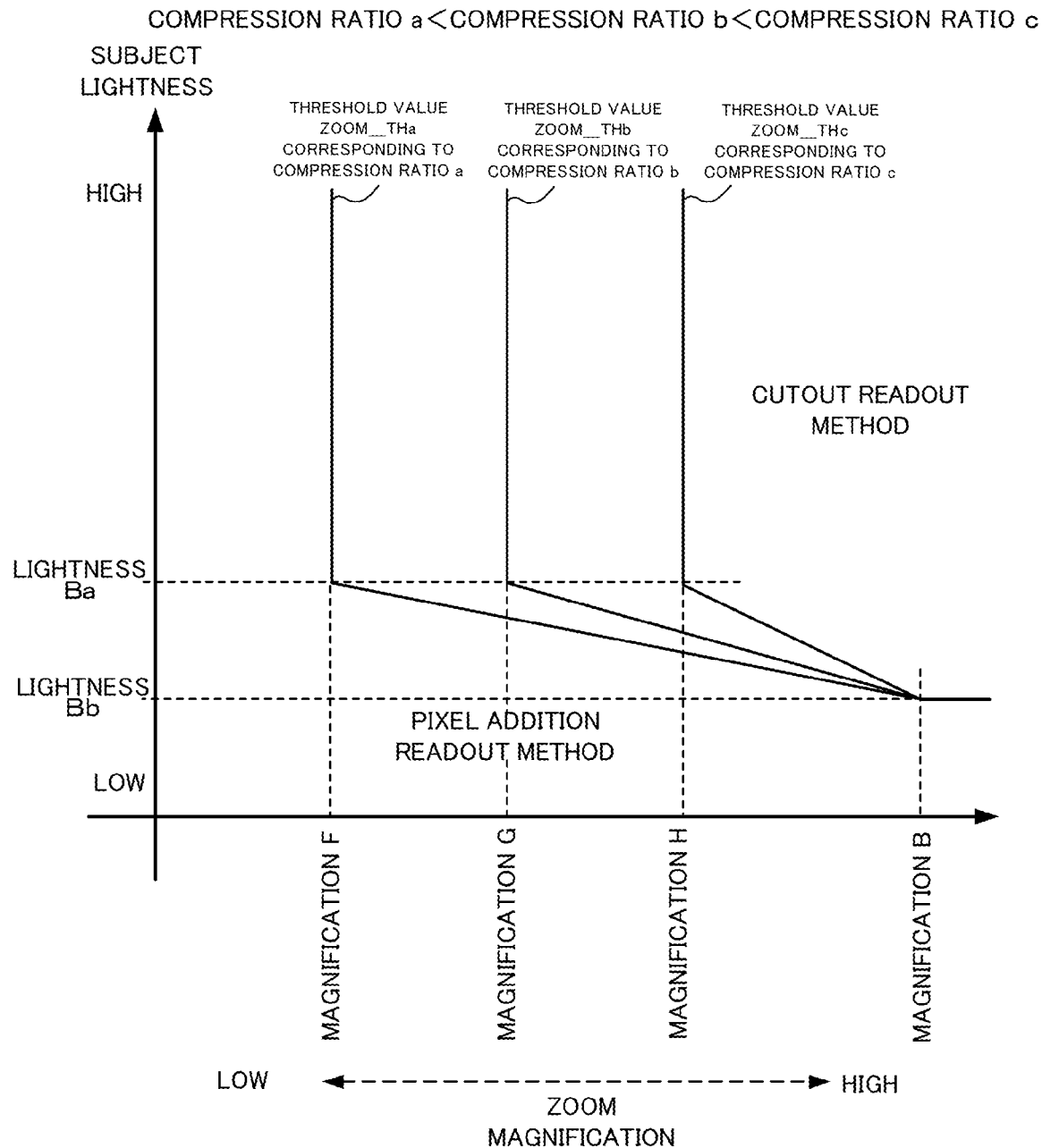

FIG.16

| IMAGE COMPRESSION RATIO | LIGHTNESS | THRESHOLD VALUE |
|---|---|---|
| IMAGE COMPRESSION RATIO a | LIGHTNESS $Ba_1$ | THRESHOLD VALUE $THa_1$ |
| | LIGHTNESS $Ba_2$ | THRESHOLD VALUE $THa_2$ |
| | LIGHTNESS $Ba_3$ | THRESHOLD VALUE $THa_3$ |
| | .... | .... |
| | .... | .... |
| IMAGE COMPRESSION RATIO b | LIGHTNESS $Bb_1$ | THRESHOLD VALUE $THb_1$ |
| | LIGHTNESS $Bb_2$ | THRESHOLD VALUE $THb_2$ |
| | LIGHTNESS $Bb_3$ | THRESHOLD VALUE $THb_3$ |
| | .... | .... |
| | .... | .... |
| IMAGE COMPRESSION RATIO c | LIGHTNESS $Bc_1$ | THRESHOLD VALUE $THc_1$ |
| | LIGHTNESS $Bc_2$ | THRESHOLD VALUE $THc_2$ |
| | LIGHTNESS $Bc_3$ | THRESHOLD VALUE $THc_3$ |
| | .... | .... |
| | .... | .... |
| ..... | .... | .... |
| | .... | .... |
| | .... | .... |
| | .... | .... |

71

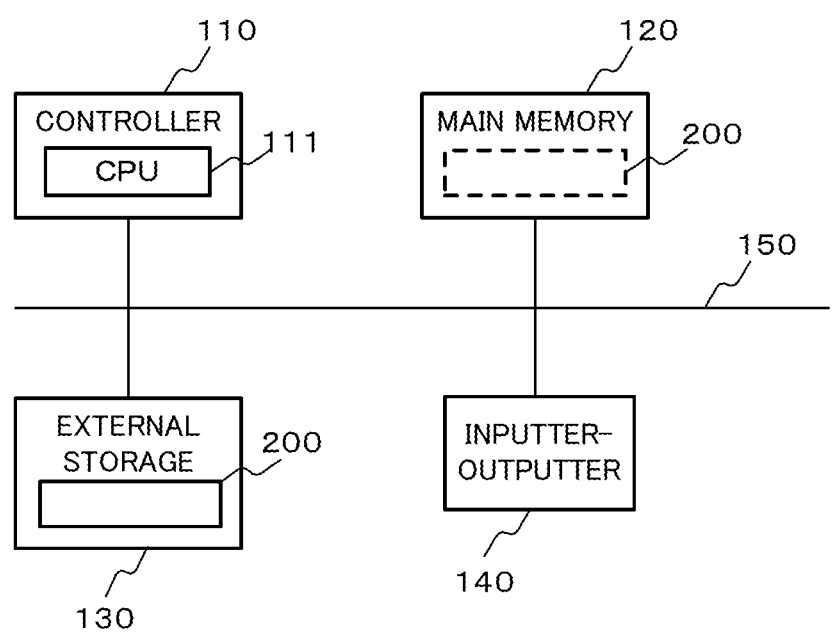

DEVICE, METHOD, AND RECORDING MEDIUM FOR SETTING A READOUT METHOD BASED ON A ZOOM SETTING AND IDENTIFIED THRESHOLD VALUE

CROSS-REFERENCE TO RELATED APPLICATIONS

This application is a national stage application of International Application No. PCT/JP2012/073184 entitled "Imaging Device, Imaging Method, and Recording Medium," filed on Sep. 11, 2012, which claims the benefit of the priority of Japanese patent application No. 2011-199992, filed on Sep. 13, 2011, the disclosures of each of which are hereby incorporated by reference in their entirety.

TECHNICAL FIELD

The present invention relates to an imaging device, an imaging method, and a recording medium.

BACKGROUND ART

As a method of reading out an image signal (image data) from an image sensor of an imaging device, a pixel addition readout method and a cutout readout method are known. In the pixel addition readout method, an image signal is read out from a plurality of pixels as a single pixel. In the cutout readout method, an image signal is read out from each pixel. Each of the readout methods has both advantages and disadvantages.

The pixel addition readout method has advantages that: an image signal can be read out with low electric power for an image of a wide-angle view; sensitivity is improved since image signals of a plurality of pixels are added and read out; and a proportion of noise contents in image signals is reduced. Disadvantages of the pixel addition readout method are, for example, that: resolution of an image is deteriorated since image signals of a plurality of pixels are added; and an image includes jaggies due to phase-shifting between pixels.

As to the cutout readout method, advantages are that: a high-resolution image can be obtained; and an image includes less jaggies. Disadvantages of the cutout readout method are that: an angle of view is narrow; and sensitivity is lower than that in the pixel addition readout method.

As described above, each of the readout methods has distinctive advantages and disadvantages, respectively. Therefore, a readout method of selecting an optimal readout method according to a zoom magnification or a subject lightness indicating brightness of a subject is employed.

For example, Patent Literature 1 discloses an imaging device that switches between the pixel addition readout method and the cutout readout method (non-pixel-addition method) according to a zoom magnification. In this imaging device, variable magnification processing and trimming processing are performed on a read-out image to fit the image to an image size for display. With this imaging device, which switches between the readout methods, an image with high resolution can be shown on a display without affecting an image displayed in an electronic viewfinder.

Moreover, Patent Literature 2 discloses an imaging device that reads out image signals by switching in each frame between a live-view readout method (cutout readout method) and the pixel addition readout method, when a subject lightness is low. In this imaging device, an image is displayed on a display during a period in which image signals are read out by the live-view readout method, while automatic focus is controlled during a period in which image signals are read out by the pixel addition readout method.

Furthermore, Patent Literature 3 discloses an imaging device that the pixel addition readout method is set when a shooting location is dark, while the cutout readout method (thinning-out readout method) is set when a shooting location is light.

CITATION LIST

Patent Literature

Patent Literature 1: Unexamined Japanese Patent Application Kokai Publication No. 2010-136218.
Patent Literature 2: Unexamined Japanese Patent Application Kokai Publication No. 2006-261929.
Patent Literature 3: Unexamined Japanese Patent Application Kokai Publication No. 2003-189183.

SUMMARY OF INVENTION

Technical Problem

The imaging devices described in Patent Literatures 1 to 3 have possibility of not providing satisfactory images when capturing zoomed-in images of a subject.

For example, assume that a zoom magnification reaches a threshold value as a result of zooming in on a subject, and consequently a readout method is switched from the pixel addition readout method to the cutout readout method. In this case, an image of the subject is dark due to zooming-in, and sensitivity of an imaging device is low in the cutout readout method. For these reasons, a proportion of random noise is high in the image, being unable to obtain a high-quality image. Here, an increase in gain in processing for amplifying image signals can compensate low sensitivity due to the cutout readout method. However, such an increase in gain emphasizes random noise in the image, being unable to obtain a high-quality image.

The present invention has been made to solve the above-described problems, and aims to provide an imaging device, an imaging method, and a recording medium that makes it possible to obtain a high-quality image in accordance with a subject lightness and a zoom magnification in capturing a zoomed-in image of a subject.

Solution to Problem

To achieve the above-described objective, an imaging device according to a first aspect of the present invention comprises: an imager including an imaging element with a plurality of pixels arranged two-dimensionally, that reads out image signals from the plurality of pixels in accordance with a readout method being set from either a pixel addition readout method for reading out image signals of a plurality of pixels of the imaging element as an image signal corresponding to a single pixel, or a cutout readout method for reading out image signals of all of pixels or part of pixels individually, and then outputs the image signals; a signal processor that outputs a captured image defined by the image signals output by the imager; a zoom setter that sets a zoom magnification based on a zoom signal for specifying the zoom magnification; a lightness detector that detects a subject lightness indicating brightness of the subject; and a readout-method switching controller that identifies a threshold value corresponding to the subject lightness detected by the lightness detector based on a threshold characteristic in which the threshold value changes according to the subject lightness, and sets the readout method based on a result obtained by comparing the set zoom magnification and the identified threshold value.

To achieve the above-described objective, an imaging method according to a second aspect of the present invention comprises: an imaging step of reading out image signals from a plurality of pixels in accordance with a readout method being set from either a pixel addition readout method for reading out image signals of the plurality of pixels in an imaging element as an image signal corresponding to a single pixel, or a cutout readout method for reading out image signals of all of pixels or part of pixels individually, and then outputting the image signals; a signal processing step of outputting a captured image defined by the image signals output in the imaging step; a zoom setting step of setting a zoom magnification based on a zoom signal for specifying the zoom magnification; a lightness detection step of detecting a subject lightness indicating brightness of the subject; and a readout-method switching controlling step of identifying a threshold value corresponding to the subject lightness detected by the lightness detection step based on a threshold characteristic in which the threshold value changes according to the subject lightness, and setting the readout method based on a result obtained by comparing the set zoom magnification and the identified threshold value.

To achieve the above-described objective, a non-transitory computer-readable recording medium according to a third aspect of the present invention stores a program for causing a computer to execute: an imaging step of reading out image signals from the plurality of pixels in accordance with a readout method being set from either a pixel addition readout method for reading out image signals of a plurality of pixels in an imaging element as an image signal corresponding to a single pixel, or a cutout readout method for reading out image signals of all of pixels or part of pixels individually, and then outputting the image signals; a signal processing step of outputting a captured image defined by the image signals output in the imaging step; a zoom setting step of setting a zoom magnification based on a zoom signal for specifying the zoom magnification; a lightness detection step of detecting a subject lightness indicating brightness of the subject; and a readout-method switching controlling step of identifying a threshold value corresponding to the subject lightness detected in the lightness detection step based on a threshold characteristic in which the threshold value changes according to the subject lightness, and setting the readout method based on a result obtained by comparing the set zoom magnification and the identified threshold value.

Advantageous Effects of Invention

With the present invention, a high-quality image can be obtained in accordance with a subject lightness and a zoom magnification, in capturing a zoomed-in image of a subject.

BRIEF DESCRIPTION OF DRAWINGS

FIG. 15 is a graph showing threshold characteristics of the imaging device according to Embodiment 3;

FIG. 16 is a diagram showing a threshold characteristics table of the imaging device according to Embodiment 3; and FIG. 17 is a block diagram showing an example of a configuration of the imaging device according to the embodiments, as a computer.

Figure 1:
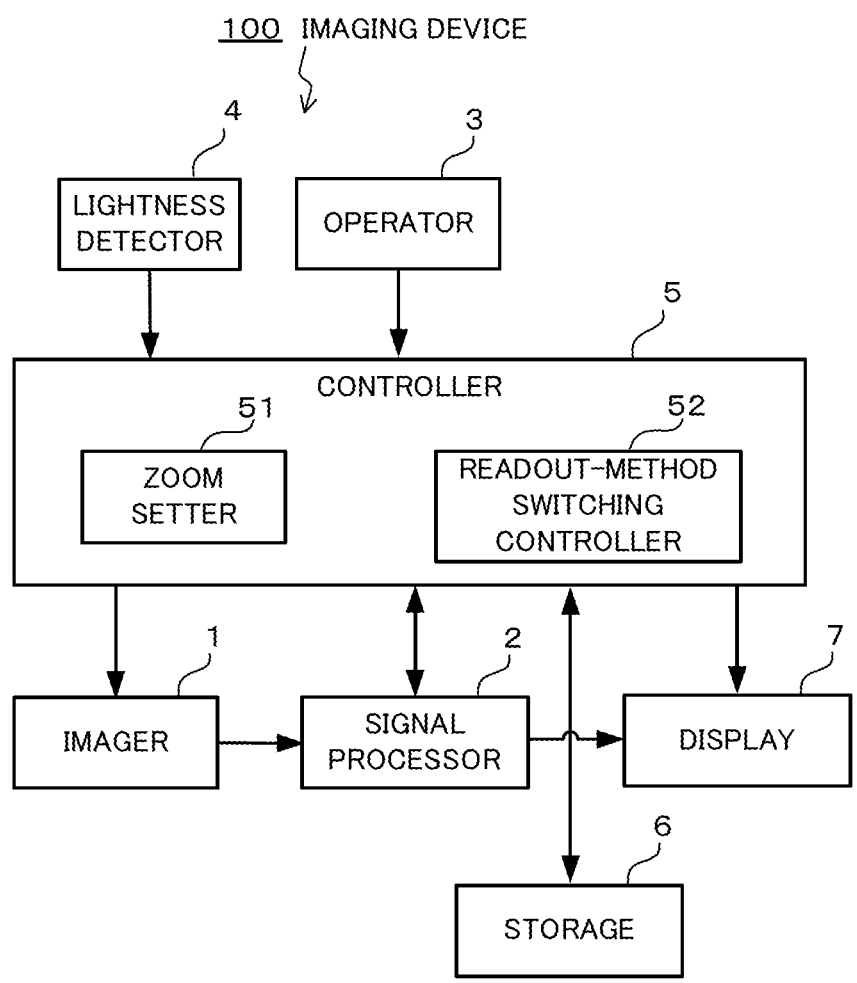
FIG. 1 is a block diagram showing an example of a configuration of an imaging device according to Embodiment 1 of the present invention.

DESCRIPTION OF EMBODIMENTS (Embodiment 1)
In the following, an embodiment of the present invention will be described in detail by referring to the drawings. An imaging device 100 according to this embodiment includes an imager 1, a signal processor 2, an operator 3, a lightness detector 4, a controller 5, a storage 6, and a display 7, as shown in FIG. 1.

The imager 1 includes a lens unit and an image sensor unit. The lens unit is an optical system including a plurality of lenses, a focusing mechanism, an optical-zoom mechanism, an iris mechanism, and the like, and forms an image of a subject on a light-receiving surface of the image sensor unit. The focusing mechanism, the optical-zoom mechanism, the iris mechanism, and the like are controlled by the controller 5.

The image sensor unit includes an imaging element in which a plurality of pixels are arranged two-dimensionally, such as CCD (Charge Coupled Device), CMOS (Complementary Metal Oxide Semiconductor), or the like. Each pixel of the imaging element converts an optical signal incident from a subject via the lens unit, to an image signal representing a quantity of electric charge. Image signals of the two-dimensionally arranged pixels constitute a captured image. The imaging element includes n pixels (for example, 4800 pixels) horizontally (in a main scanning direction) while including m pixels (for example, 3600 pixels) vertically (in the subscanning direction). The image sensor unit reads out image signals of the respective pixels by a readout method (to be described later) being set by the controller 5, and then outputs the read-out image signals.

The signal processor 2 performs processing, for example: A/D conversion processing for converting each analog image signal output from the imager 1, to a digital signal; signal separation processing for separating each digitalized image signal into a luminance signal and a color difference signal; and high-quality image processing for noise reduction, edge enhancement, and the like. The signal processor 2 stores, in the storage 6, image signals subjected to the processing, and also outputs the image signals to the display 7 as a captured image. Moreover, the signal processor 2 performs electronic-zoom processing for enlarging or reducing a size of the captured image, for example, according to an electronic-zoom (digital-zoom) magnification notified by the controller 5. When enlarging or reducing the size of the captured image, the signal processor 2 performs variable magnification processing, trimming processing, and the like on the captured image, to fit the image to the number of pixels of the display 7 or the number of pixels of a recorded image.

The operator 3 includes a zoom operator and a plurality of switches such as a power switch and a shutter switch, and provides the controller 5 with operation information, in response to a user operation. For example, when a user operates the zoom operator formed of a zoom button or the like, the operator 3 provides (outputs) the controller 5 with operation information indicating zooming-in or zooming-out, as a zoom signal.

The lightness detector 4 includes an image sensor in which a plurality of imaging elements are arranged, and detects a subject lightness indicating brightness of a subject and then transmits a detection result as a detected lightness, to the controller 5. Here, the subject lightness is an average value of signal amounts of image signals output from each of the imaging elements of the image sensor in capturing an image of a subject.

The controller 5 includes a processor such as a CPU (Central Processing Unit), a program memory, such as a ROM (Read Only Memory) and a flash memory, for storing a control program, and a working memory such as a RAM (Random Access Memory). The controller 5 performs each kind of processing by reading out the control program stored in the program memory, to the working memory, and executing the control program to control the imager 1, the signal processor 2, the operator 3, and the lightness detector 4. Moreover, the controller 5 controls the storage 6 and the display 7 so that a processing result may be stored in the storage 6 and displayed on the display 7 when needed.

The controller 5 includes a zoom setter 51 and a readout-method switching controller 52 as functional components. These components control each unit of the imaging device 100 by executing the control program.

Based on a zoom signal for notifying of operation information indicating zooming-in or zooming-out, input by the operator 3, the zoom setter 51 sets a zoom magnification for a subject in a range between a wide-angle view and a telescopic view. Moreover, based on the zoom magnification, the zoom setter 51 sets an optical-zoom magnification and an electronic-zoom magnification, and controls the optical-zoom mechanism of the imager 1 according to the optical-zoom magnification while notifying the signal processor 2 of the electronic-zoom magnification. Note that, the final zoom magnification is a product of the optical-zoom magnification and the electronic-zoom magnification.

The readout-method switching controller 52 sets an image-signal readout method according to the zoom magnification set by the zoom setter 51 and the detected lightness (subject lightness) detected by the lightness detector 4, and then notifies the image sensor unit of the imager 1, of the image-signal readout method. The image-signal readout method is selected from the pixel addition readout method and the cutout readout method.

The storage 6 includes a storage device such as a hard disk and a flash memory, and stores the image signals output by the signal processor 2.

The display 7 includes a display screen such as an LCD (Liquid Crystal Display) and an organic EL (Electro Luminescence) display, for example, and displays the image signals output by the signal processor 2, as a captured image.

The pixel addition readout method is a method of reading out image signals of a plurality of pixels as an image signal of a single pixel, in reading out image signals from the imaging element of the image sensor unit and then outputting the image signals. Specifically, in the pixel addition readout method, the image sensor unit performs addition processing or averaging processing on image signals of a plurality of pixels, and thereby reads out the image signals as an image signal of one single pixel. The pixel addition readout method is usually used while capturing an image with a wide-angle view, that is, a low zoom magnification. When this readout method is used, the resolution deteriorates at a degree according to the number of pixels subjected to the addition processing or the averaging processing. By contrast, since the addition processing or the averaging processing is performed on image signals of a plurality of pixels, a proportion of random noise included in the image signals is lower than that in the cutout readout method. In case of selecting the pixel addition readout method, the number of pixels of the imaging element is desirably larger than each of the number of pixels of the display 7 and the number of pixels for recording.

In the cutout readout method, when reading out image signals from the imaging element of the image sensor unit and then outputting the image signals, an entire region or a partial region is cut out from the imaging element, and image signals of pixels in the region are read out as image signals of the original pixels without performing the addition processing or the averaging processing on the image signals between the pixels. The cutout readout method is usually used while capturing an image with a telescopic view, that is, a high zoom magnification. In this readout method, the resolution is not deteriorated. However, a proportion of random noise in the image signals is higher than that in the pixel addition readout method.

Figure 2:
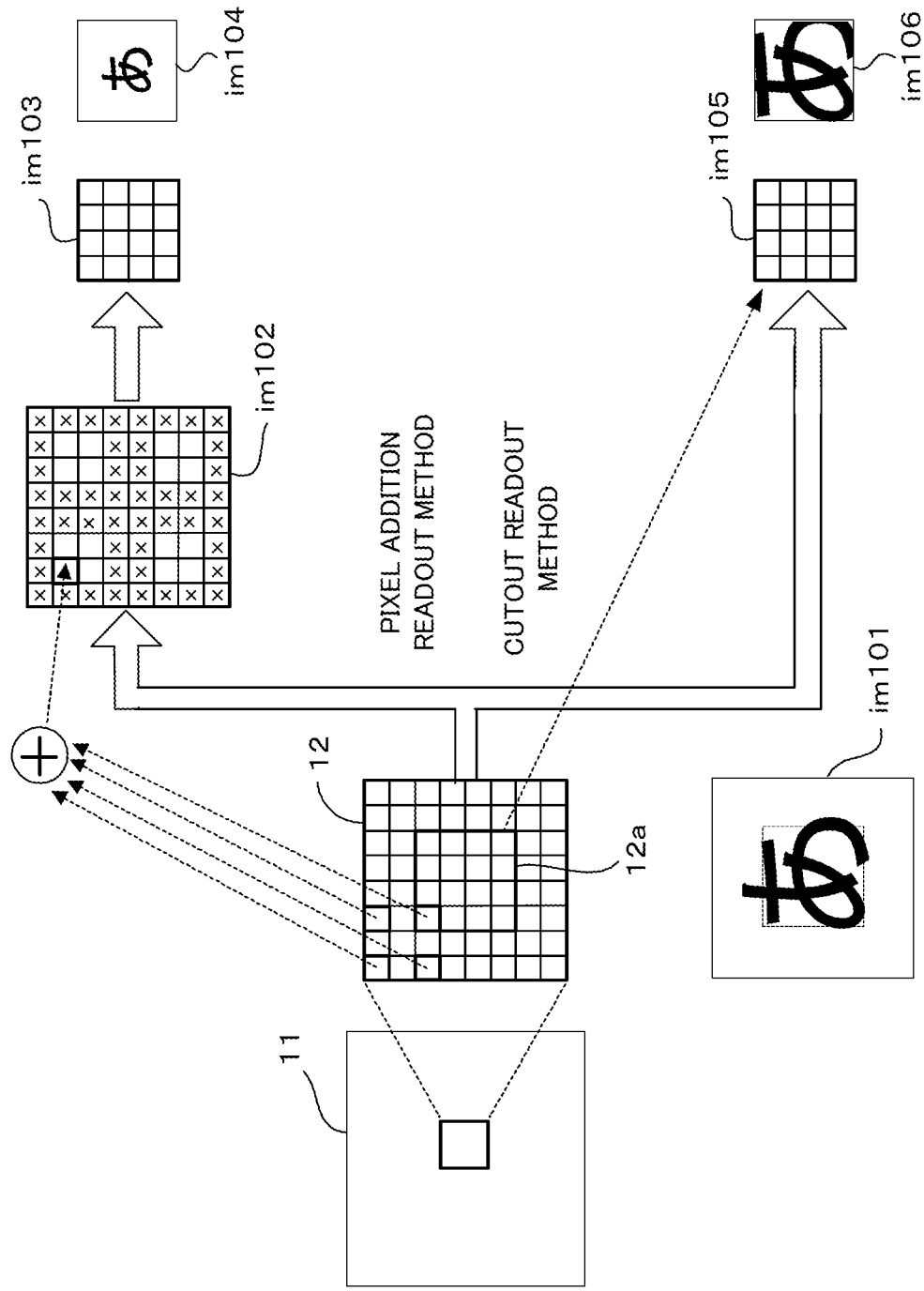
FIG. 2 is an explanatory view of methods for reading out image signals.

Concrete examples of the two readout methods will be described by referring to FIG. 2. The upper part in FIG. 2 shows an example of reading out a captured image by the pixel addition readout method. In addition, the lower part in FIG. 2 shows an example of reading out a captured image by the cutout readout method. As described above, an image sensor 11 of the image sensor unit is provided with an imaging element 12. Here, for the sake of easy understanding, assume that the imaging element 12 consists of 64 pixels in total, that is, eight pixels horizontally and eight pixels vertically. An image im101 is an image of a captured image generated on the basis of image signals of 64 respective pixels constituting the imaging element 12. Note that the captured image may be a captured image obtained by an imaging element 12 consisting of more than 64 pixels.

In the pixel addition readout method, the image sensor unit adds image signals of four pixels and reads out the image signals as an image signal of a single pixel, as shown in FIG. 2. Then, the image sensor unit outputs an output image im103 to be displayed, from an image im102 generated on the basis of the read-out image signals. In this example, the image sensor unit outputs the output image im103 corresponding to 16 pixels, which is one fourth of the 64 pixels. An image of the output image im103 is shown as an image im104. In this example, the image im104 corresponds to the image of the entire image im101. The reason why every other pixel is selected for the four pixels to be added together in FIG. 2 is that each image signal corresponds to one of RBG color difference signals and also the image signals to be added together are those corresponding to the color difference signals of the same hue.

By contrast, in the cutout readout method, the image sensor unit cuts out a region 12a, which consists of 16 pixels in total, that is four pixels horizontally and four pixels vertically, from among all pixels of the imaging element 12 to be subjected to the image processing, the number of pixels in the region 12a being the same as that of the image output in the pixel addition readout method, as shown in FIG. 2. Then, the image sensor unit outputs an output image im105 corresponding to 16 pixels arranged in the cut-out region 12a. An image of the output image im105 is shown as an image im106. The image im106 is a captured image obtained by the imaging element 12 consisting of 64 pixels. In the image im106, the image shown in a partial region of the image im101 is shown in the same region as that showing the image im104. Hence, the image im106 corresponds to a zoomed-in image of the image im104.

The readout-method switching controller 52 of the controller 5 sets the pixel addition readout method as the readout method when a zoom magnification is lower than a readout-method switching threshold value, while setting the cutout readout method as the readout method when the zoom magnification is larger than the readout-method switching threshold value.

A feature of the imaging device 100 according to this embodiment is that the readout-method switching threshold value contains threshold characteristics in which the readout-method switching threshold value changes depending on a subject lightness. The threshold characteristics are shown as readout-method switching threshold values ZOOM_TH in FIG. 3. The threshold values ZOOM_TH contain characteristics in which the threshold value changes to a larger zoom magnification value with decrease in subject lightness, when the subject lightness is in a range between a subject lightness Ba and a subject lightness Bb.

The reason for setting such threshold characteristics is to enable reading out image signals by the pixel addition readout method at a higher zoom magnification as the subject lightness decreases, since a proportion of random noise in image signals increases as the subject lightness decreases and thereby an image quality is lowered accordingly. Hence, the threshold characteristics can prevent the image quality of a captured image from being deteriorated when the subject lightness decreases.

Figure 3:
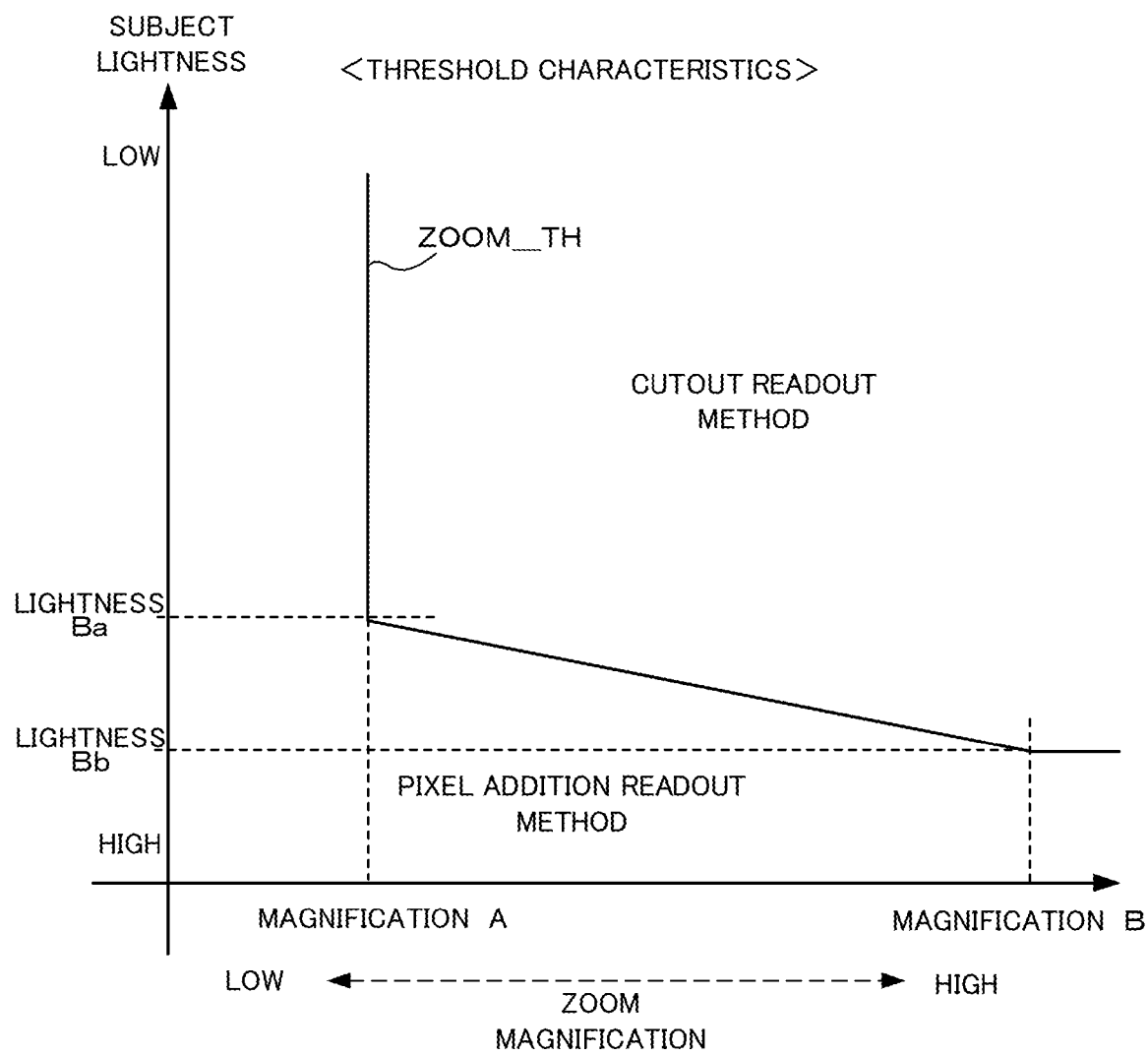
FIG. 3 is a graph showing threshold characteristics for switching between image-signal readout methods of the imaging device according to Embodiment 1.

According to the threshold characteristics shown in FIG. 3, a zoom magnification A (magnification A) is the readout-method switching threshold value ZOOM_TH when the subject lightness is above the lightness Ba, as in conventional characteristics. When the subject lightness is lower than the lightness Bb (lightness Bb<lightness Ba), no readout-method switching threshold value ZOOM_TH is set. Hence, the readout-method switching controller 52 sets the pixel addition readout method as the readout method irrespective of zoom magnification. When the subject lightness is in a range between the lightness Ba and the lightness Bb, the threshold value changes depending on the subject lightness.

Figure 4:
FIG. 4 is a diagram showing a threshold characteristics table of the imaging device according to Embodiment 1.

The threshold characteristics shown in FIG. 3 are stored in a threshold characteristics table 71 so that each of subject-lightness values can correspond to respective zoom-magnification threshold values (the threshold characteristics table 71 is stored in the storage 6), as shown in FIG. 4, for example. The threshold characteristics are read out from the threshold characteristics table 71 by the readout-method switching controller 52 as needed. Note that the threshold characteristics may be stored in any possible form such as a form of a function, instead of a form of a table.

Figure 5:
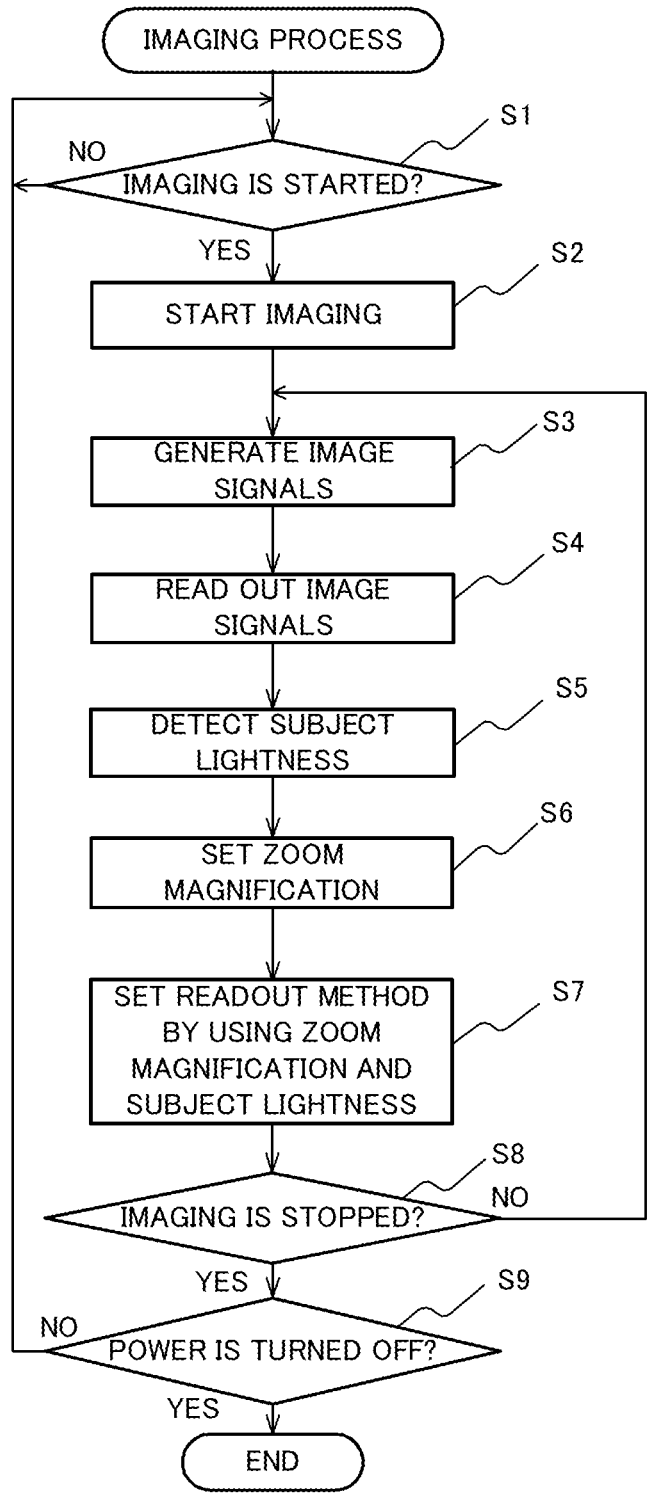
FIG. 5 is a flowchart showing operations in an imaging process of the imaging device according to Embodiment 1.

Next, operations of the imaging device 100 at the time of capturing images including zooming will be described, according to a flowchart shown in FIG. 5. FIG. 5 shows an imaging process in capturing a video.

The controller 5 of the imaging device 100 determines whether or not an imaging start signal is input by the operator 3 (Step S1). An imaging start signal is input by a user of the imaging device 100 via the operator 3. When no imaging start signal is input (Step S1; NO), the controller 5 returns to Step S1 and stands by until an imaging start signal is input.

When an imaging start signal is input (Step S1; YES), the controller 5 controls the imager 1 to start capturing an image (Step S2). Upon start of capturing an image, the imager 1 generates image signals for a predetermined time period (Step S3). Then, the imager 1 reads out generated image signals, and outputs the read-out image signals to the signal processor 2 (Step S4).

In the above step, the imager 1 reads out image signals in accordance with a pre-set readout method. Generally, the pixel addition readout method is set as a readout method at the start of image capturing.

In addition, the lightness detector 4 detects a subject lightness, and transmits a result to the controller 5 as a detected lightness (Step S5). Moreover, the zoom setter 51 sets a zoom magnification based on a zoom signal input by the operator 3 (Step S6).

Based on the threshold characteristics, the readout-method switching controller 52 acquires a threshold value corresponding to the detected lightness received from the lightness detector 4. Subsequently, the readout-method switching controller 52 sets a readout method according to relationship in value between the acquired threshold value and the zoom magnification set by the zoom setter 51, and then transmits, to the imager 1, information indicating the set readout method (Step S7). The relationship in value between the threshold value acquired by the readout-method switching controller 52 and the zoom magnification set by the zoom setter 51 may vary as a result of a change of the acquired threshold value according not only to change of the zoom magnification but also to change of the detected lightness.

Thereafter, the controller 5 determines whether or not the imaging is to stop based on whether or not an imaging stop signal is input by the operator 3 (Step S8). When determining that the imaging is not to stop (Step S8; NO), the controller 5 returns to Step S3 and continues generating image signals, that is, capturing an image, by the imager 1 for the predetermined time period. When determining that the imaging is to stop (Step S8; YES), the controller 5 determines whether or not a power-off signal is input via the operator 3 (Step S9). When no power-off signal is input (Step S9; NO), the controller 5 returns to Step S1 and stands by until an imaging start signal is input. When a power-off signal is input (Step S9; YES), the controller 5 terminates the imaging process.

The flowchart in FIG. 5 shows an imaging method as well as operations of the imaging device 100 according to FIG. 1.

Figure 6:
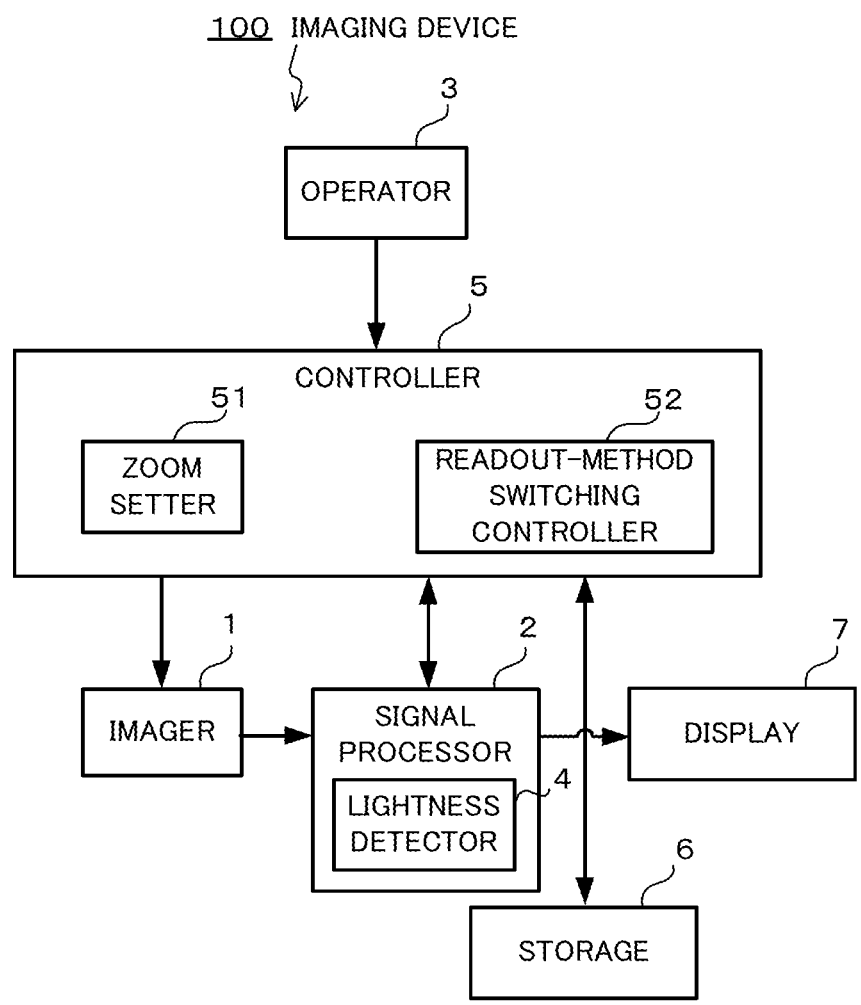
FIG. 6 is a block diagram showing a configuration of an imaging device according to a modified example of Embodiment 1.

FIG. 6 shows a configuration of an imaging device 100 according to a modified example of this embodiment. FIG. 6 is different from FIG. 1 in that a lightness detector 4 is provided as a functional component of a signal processor 2. The signal processor 2 has a signal-separation processing function for separating each image signal into a luminance signal and a color difference signal, as described above. The lightness detector 4 calculates an average value of luminance levels of the luminance signals obtained at respective pixels in the separation, and detects the average value as a lightness. In this lightness detection, the average value of the luminance levels may be calculated after weighting is carried out for pixels in a region determined to be important by the controller 5.

Operations of the imaging device 100 in FIG. 6 are the same as those in the imaging process shown in FIG. 5.

As described above, the imaging device 100 shown in FIGS. 1 and 6 changes the zoom-magnification threshold value ZOOM_TH for the switching between the image-signal readout methods, according to a subject lightness, at the time of capturing images while zooming in or zooming out. Specifically, when the subject lightness is low, the imaging device 100 extends a zoom-magnification range for capturing an image by the pixel addition readout method toward a telescopic view as the subject lightness decreases. With this feature, using the readout-method switching method of the imaging device 100 makes it possible to obtain a well-balanced image in terms of deterioration of image quality due to random noise and deterioration of image quality due to lower resolution resulting from pixel addition, and thereby a captured image in relatively high quality can be obtained, compared to a case using a conventional switching method in which the switching of the readout method is carried out with a fixed zoom-magnification threshold value. These advantageous effects can be obtained regardless of whether the lightness detector 4 is provided as a separate hardware or implemented as a functional component of the signal processor 2.

In case of the imaging device 100 having the configuration shown in FIG. 1, the lightness detector 4 is provided separately from the signal processor 2, for example, as a lightness sensor. This enables accurate detection of subject lightness.

By contrast, in case of the imaging device 100 having the configuration in FIG. 6, the lightness detector 4 is included in the signal processor 2 as a functional component, which avoids necessity of an additional hardware. This provides advantageous effects of allowing the imaging device 100 to be compact in size and also a manufacturing cost of the imaging device 100 to be reduced.

In the above description, the readout-method switching controller 52 sets a readout method. Alternatively, the readout-method switching controller 52 may set whether or not to switch a readout method, and output a switching signal to the image sensor unit of the imager 1 when the readout method is set to be switched. When relationship in value between a zoom magnification set by the zoom setter 51 and a threshold value acquired based on the threshold characteristics and the detected lightness changes, the readout-method switching controller 52 sets to switch the readout method and consequently generates a switching signal. Here, the time when the relationship in value changes includes: when the relationship in value changes with the threshold value as a result of a change in zoom magnification by zooming-in or zooming-out; when a detected lightness is changed due to a change in subject lightness, thereby a threshold value acquired based on the detected lightness and the threshold characteristics is changed, and consequently the relationship in value between the acquired threshold value and the zoom magnification changes; and when the relationship in value changes as a result of changes in both zoom magnification and threshold value.

Note that the image sensor unit of the imager 1 uses a readout method pre-set in the image sensor unit as the first readout method at startup, and switches, upon input of a switching signal, the currently-set readout method to the other readout method to read out image signals. Here, the pixel addition readout method is usually set as the first readout method at startup.

Figure 7:
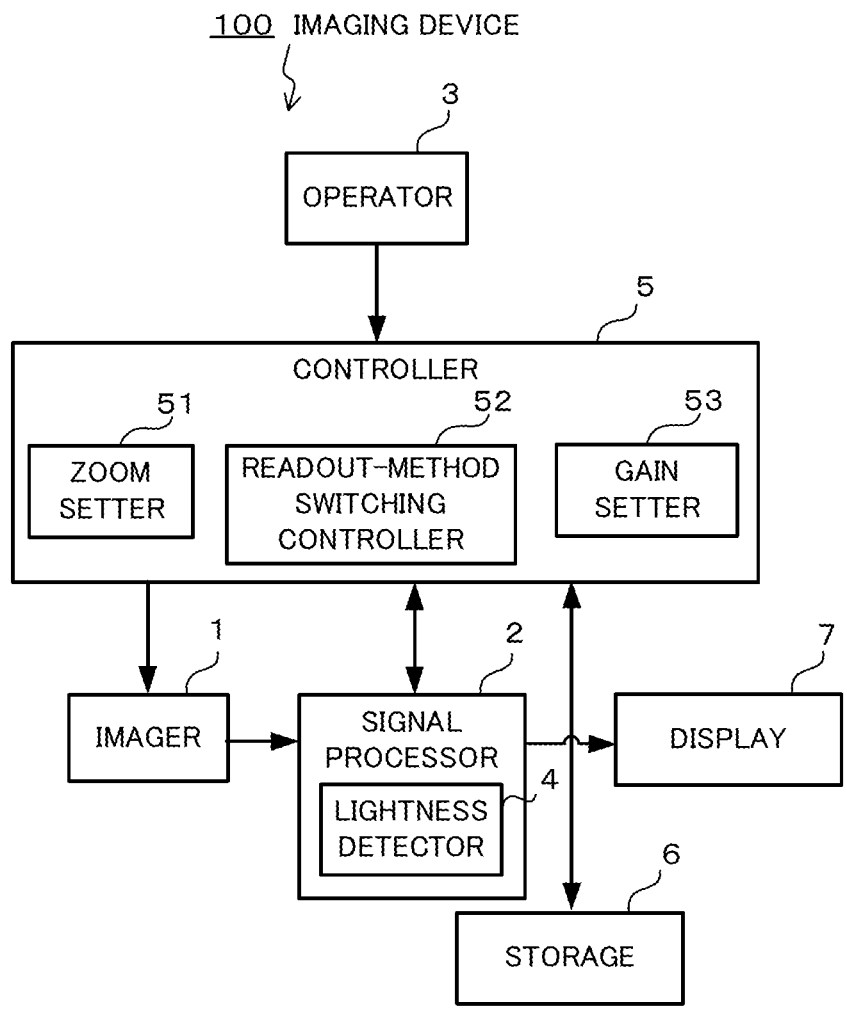
FIG. 7 is a block diagram showing a configuration of an imaging device according to a different modified example of Embodiment 1.

FIG. 7 shows a configuration of an imaging device 100 according to a different modified example of this embodiment. The configuration is different from that in FIG. 6 in that a controller 5 includes a gain setter 53. FIG. 7 shows a case of including a lightness detector 4 as a functional component in a signal processor 2, as an example.

The gain setter 53 sets a gain value to be multiplied to each image signal output by the image sensor unit of the imager 1, and transmits the gain value to the imager 1. The gain value is set by automatic gain control (Automatic Gain Control) carried out in automatic exposure (Automatic Exposure), based on a detected lightness (subject lightness) being input by the lightness detector 4. The image sensor unit of the imager 1 multiplies each image signal by the received gain value, and then outputs, to the signal processor 2, the image signal multiplied by the gain value, as a new image signal.

The reason why each image signal is multiplied by the gain value is that, when the subject lightness is lower than a lightness for facilitating processing on an image signal by the signal processor 2, the subject lightness is amplified to this lightness. Accordingly, when the subject lightness is low, the gain value is set larger; and when the subject lightness is high, the gain value is set smaller. Note that an upper-limit value and a lower-limit value are set for the gain value due to circuit limits. Accordingly, the gain value is fixed at the upper-limit gain value when the subject lightness is lower than or equal to that corresponding to the upper-limit gain value, while being fixed at the upper-limit gain value when the subject lightness is higher than or equal to that corresponding to the lower-limit gain value.

As described above, each image signal being output by the imager 1 is multiplied by a gain value. Accordingly, when the lightness detector 4 is a functional component of the signal processor 2, the lightness detector 4 divides (normalizes), by the gain value, an average value of luminance levels included in respective image signals input by the imager 1, and uses the lightness obtained by the division as a subject lightness.

The gain setter 53 divides a lightness for facilitating processing on an image signal by the signal processor 2, by the lightness detected by the lightness detector 4, and sets a value obtained as a result of the division, as a gain value. In other words, a new gain value is obtained as a result of dividing the lightness for facilitating processing on an image signal by the signal processor 2, by the lightness detected by the lightness detector 4.

In the imaging device 100 having the configuration shown in FIG. 7, the lightness detector 4 is included as a functional component of the signal processor 2. This provides advantageous effects of allowing the imaging device 100 to be compact in size and also a manufacturing cost of the imaging device 100 to be reduced, as in the case of the imaging device 100 having the configuration shown in FIG. 6.

In case that the controller 5 includes the gain setter 53, the readout-method switching controller 52 may set a readout method by using gain threshold characteristics defined as a threshold value that depends on a gain value associated with the subject lightness, instead of the threshold characteristics defined as a threshold value that depends on the subject lightness.

Figure 8:
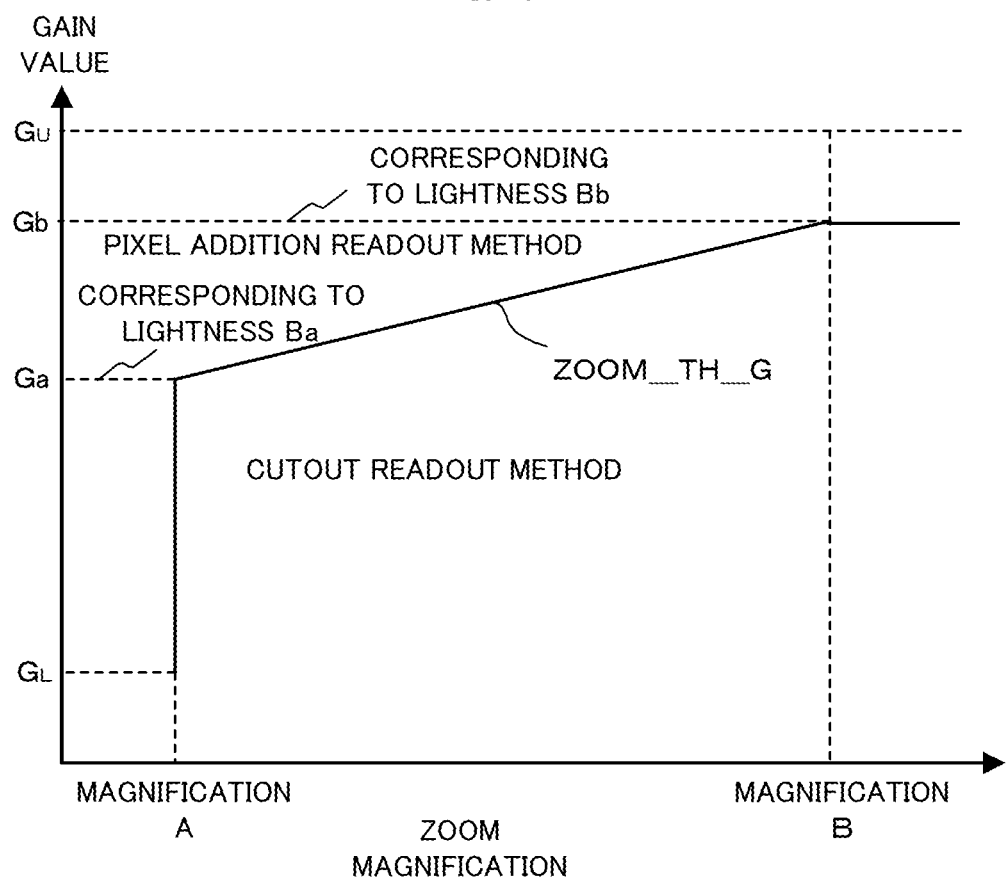
FIG. 8 is a graph showing threshold characteristics of the imaging device according to the different modified example of Embodiment 1.

FIG. 8 shows threshold values ZOOM_TH_G as the gain threshold characteristics. As in the setting of a gain value by the gain setter 53, each threshold value ZOOM_TH_G is obtained by dividing the lightness for facilitating processing on an image signals by the signal processor 2, by a corresponding subject lightness based on the threshold value ZOOM_TH in FIG. 3, and replacing the current gain value with the gain value thus obtained. Gain values $G_U$, $G_L$, $G_a$, and $G_b$ shown on the vertical axis in FIG. 8 correspond respectively to an upper-limit gain value, a lower-limit gain value, a gain value corresponding to the lightness Ba, and a gain value corresponding to the lightness Bb.

The gain threshold characteristics are stored in the threshold characteristics table 71 stored in the storage 6, for example. The readout-method switching controller 52 uses the gain threshold characteristics by reading out the gain threshold characteristics from the threshold characteristics table 71. In the threshold characteristics table 71 storing the gain threshold characteristics, each threshold value is associated with a gain value by replacing each lightness value in FIG. 4 with the gain value, for example.

The readout-method switching controller 52 reads out the threshold characteristics in a form of the threshold characteristics table 71 from the storage 6, and then sets a readout method based on the read-out threshold characteristics, a zoom magnification set by the zoom setter 51, and a gain value set by the gain setter 53.

Operations of the imaging device 100 in case of switching between the readout methods by using the gain threshold characteristics as described above can be obtained by changing Steps S5 and S7 in the imaging process shown in FIG. 5, as follows. In Step S5, first, the lightness detector 4 detects a subject lightness. Then, the gain setter 53 sets a gain value based on the detected lightness. In Step S7, the part, based on the subject lightness, is replaced with a phrase, based on the gain value corresponding to the subject lightness. The flowchart in FIG. 5 shows an imaging method as well as operations of the imaging device 100 using the gain threshold characteristics.

Note that the readout-method switching controller 52 may output a readout-method switching signal instead of a set readout method, as described above.

The different modified example shown in FIG. 7 shows the case of including the lightness detector 4 as a functional component of the signal processor 2. Alternatively, the lightness detector 4 may be set separately from the signal processor 2 as shown in FIG. 1. Also in this case, the gain setter 53 sets a gain value based on the detected lightness (subject lightness) obtained by the lightness detector 4.

The imaging device 100 using a gain value for the switching of the readout methods can provide the same advantageous effects as those of the imaging device 100 using a detected lightness for the switching of the readout methods, since each gain value is associated with a subject brightness.

(Embodiment 2)

An imaging device 100 according to this embodiment will be described. A hardware configuration of the imaging device 100 according to this embodiment is the same as that of the imaging device 100 according to Embodiment 1 shown in FIG. 1, FIG. 6, and FIG. 7, except for a function of a readout-method switching controller 52. For this reason, description will be given only for the readout-method switching controller 52 while description for the same parts is omitted.

In the imaging device 100 according to this embodiment, the readout-method switching controller 52 is different from the readout-method switching controller 52 according to Embodiment 1 in that a readout method is set based on threshold characteristics having hysteresis characteristics. In other words, in this embodiment, while a zoom-magnification threshold value for readout-method switching depends on a subject lightness, the threshold value is also set at different values depending on whether zooming from a wide-angle view to a telescopic view (zooming-in) is performed or zooming from a telescopic view to a wide-angle view (zooming-out) is performed.

Figure 9:
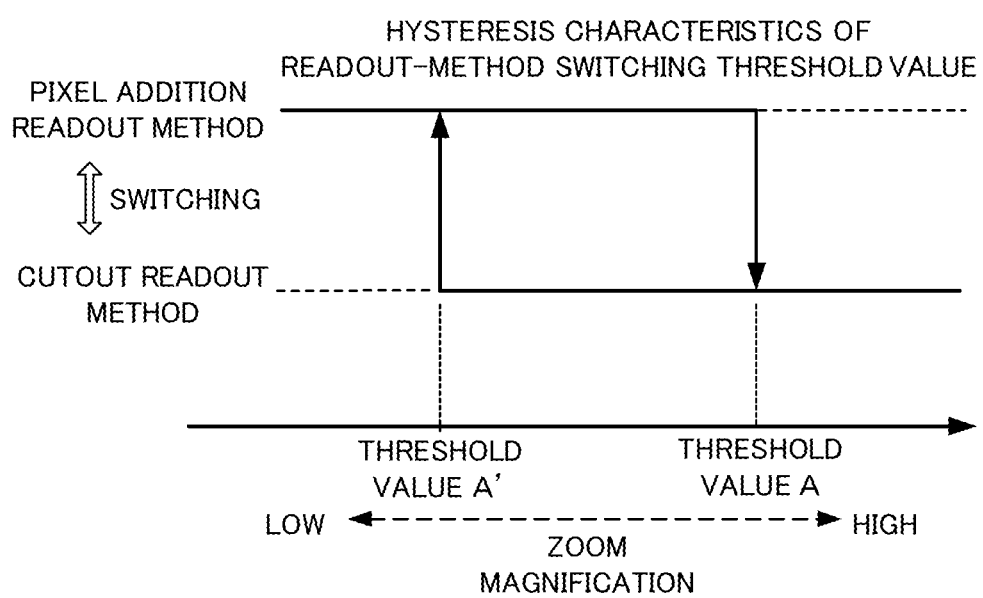
FIG. 9 is a diagram showing hysteresis characteristics of threshold values of an imaging device.

Here, assume that the subject lightness is constant regardless of change in zoom magnification. In such a case, when zooming-in from a wide-angle view to a telescopic view is performed, the threshold value for switching from the pixel addition readout method to the cutout readout method is set at a threshold value A (corresponding to threshold values ZOOM_UP_TH to be described later) as shown in FIG. 9. By contrast, when zooming-out from a telescopic view to a wide-angle view is performed, the threshold value for switching from the cutout readout method to the pixel addition readout method is set at a threshold value A' (corresponding to threshold values ZOOM_DOWN_TH to be described later) that is smaller in zoom magnification than the threshold value A.

Figure 10:
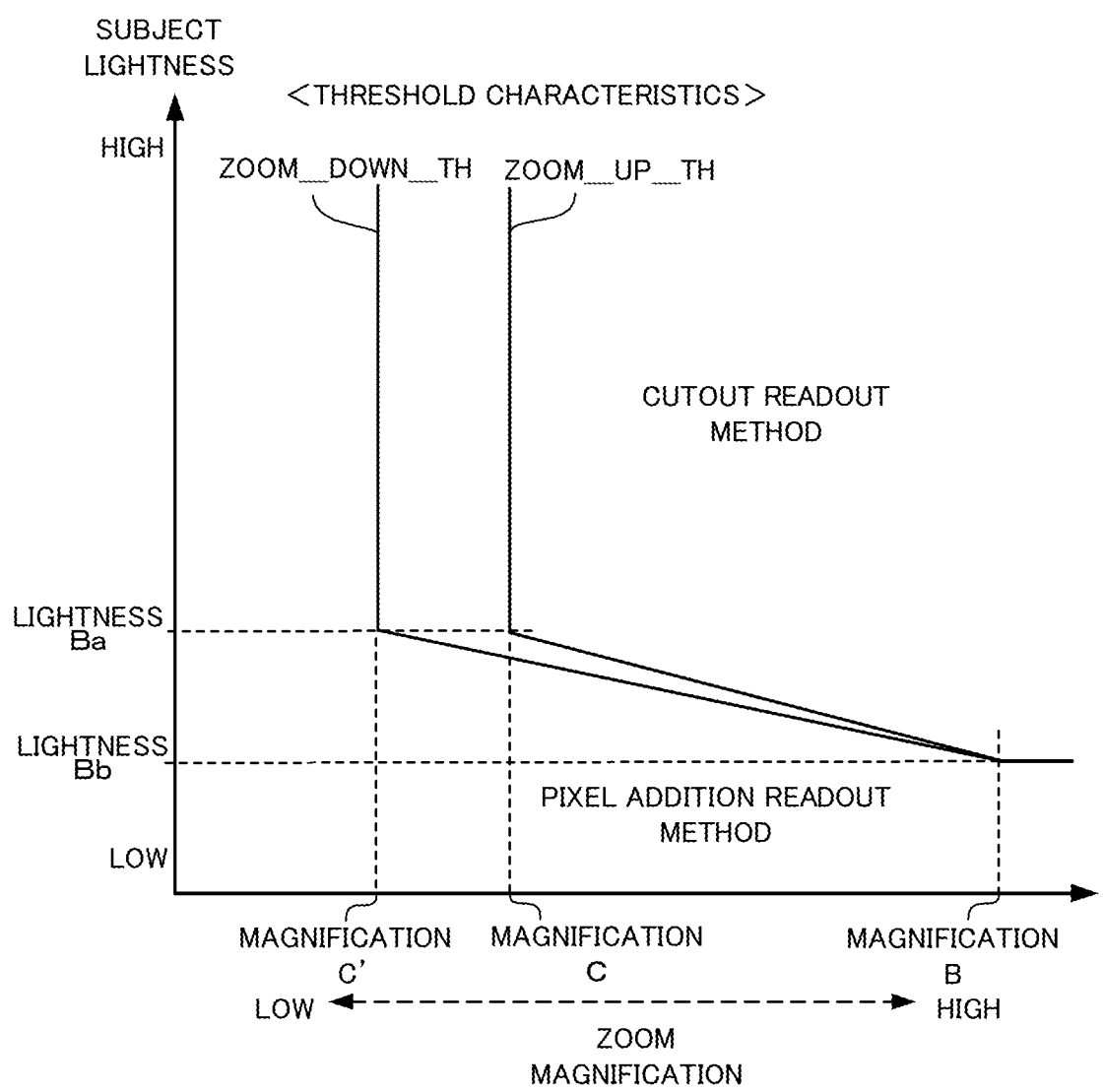
FIG. 10 is a graph showing threshold characteristics of an imaging device according to Embodiment 2 of the present invention.

In practice, the subject lightness also changes according to a change in zoom magnification. Accordingly, the threshold characteristics of the imaging device 100 according to this embodiment have two types of threshold value, ZOOM_UP_TH and ZOOM_DOWN_TH, in which the threshold value changes according to the subject lightness, as shown in FIG. 10. In an example shown in FIG. 10, a threshold value on ZOOM_DOWN_TH is set at a smaller zoom-magnification value than a threshold value on ZOOM_UP_TH, when compared at the same lightness.

When determining relationship in value between the acquired threshold value and the zoom magnification set by the zoom setter 51, the readout-method switching controller 52 determines which one of the two readout methods is currently set. The readout-method switching controller 52 reads out the threshold values ZOOM_UP_TH as a threshold value from the storage 6 when determining that the currently-set readout method is the pixel addition readout method, while reading out the threshold values ZOOM_DOWN_TH as a threshold value from the storage 6 when determining that the currently-set readout method is the cutout readout method.

Subsequently, the readout-method switching controller 52 acquires a threshold value corresponding to the detected lightness from the read out threshold values ZOOM_UP_TH or ZOOM_DOWN_TH, and determines relationship in value between the zoom magnification set by the zoom setter 51 and the acquired threshold value, to set a readout method according to a determination result.

Specifically, the readout-method switching controller 52 sets a readout method as follows. First, the readout-method switching controller 52 determines which one of the two readout methods is set as the current readout method. When a determination result shows that the pixel addition readout method is currently set as the readout method, the readout-method switching controller 52 acquires a threshold value corresponding to the detected lightness from the threshold values ZOOM_UP_TH. Then, the readout-method switching controller 52 sets the cutout readout method as the readout method when the zoom magnification set by the zoom setter 51 is larger than or equal to the acquired threshold value, while setting the pixel addition readout method as the readout method when the zoom magnification is smaller than the acquired threshold value. By contrast, when the current readout method is the cutout readout method, the readout-method switching controller 52 acquires a threshold value corresponding to the detected lightness from the threshold values ZOOM_DOWN_TH. Then, the readout-method switching controller 52 sets the pixel addition readout method as the readout method when the set zoom magnification is smaller than or equal to the acquired threshold value, while setting the cutout readout method as the readout method when the zoom magnification is larger than the acquired threshold value.

Note that the detected lightness may be changed due to a subject as well as by a zooming operation. For this reason, even though the zoom magnification is not changed by a zooming operation, an acquired threshold value may change according to a change in subject. Hence, relationship in value between the zoom magnification and the threshold value may vary when an acquired threshold value changes from the previous threshold value, even when the zoom magnification is not changed by a zooming operation.

The reason why the hysteresis characteristics are given to the threshold values is to avoid a situation in which the imaging device 100 becomes out of control for spending too much time in switching between the readout methods and thereby being unable to read out image signals smoothly. For example, when zooming-in and zooming-out are frequently performed around a threshold value in capturing a video, the relationship in value between the zoom magnification set by the zoom setter 51 and the threshold value changes frequently. This causes frequent switching between the readout methods. In such a case, the imaging device 100 may spend too much time in switching between the readout methods, and not be able to read out image signals smoothly.

Imaging operations of the imaging device 100 according to this embodiment are the same as those in the imaging process shown in FIG. 5, except for a partial difference in the operation by the readout-method switching controller 52 in Step S7. The operation in Step S7 is the same as that described for the readout-method switching controller 52 according to this embodiment. Hence, under this assumption, the flowchart in FIG. 5 shows an imaging method as well as imaging operations of the imaging device 100.

Alternatively, the readout-method switching controller 52 may not set a readout method but set whether or not to switch the readout method, and output a switching signal to the image sensor unit of the imager 1 when the readout method is set to be switched. In this case, upon input of a switching signal, the image sensor unit of the imager 1 switches the currently-set readout method to the other readout method, and reads out image signals. The first readout method at startup is generally set to the pixel addition readout method.

Figure 11:
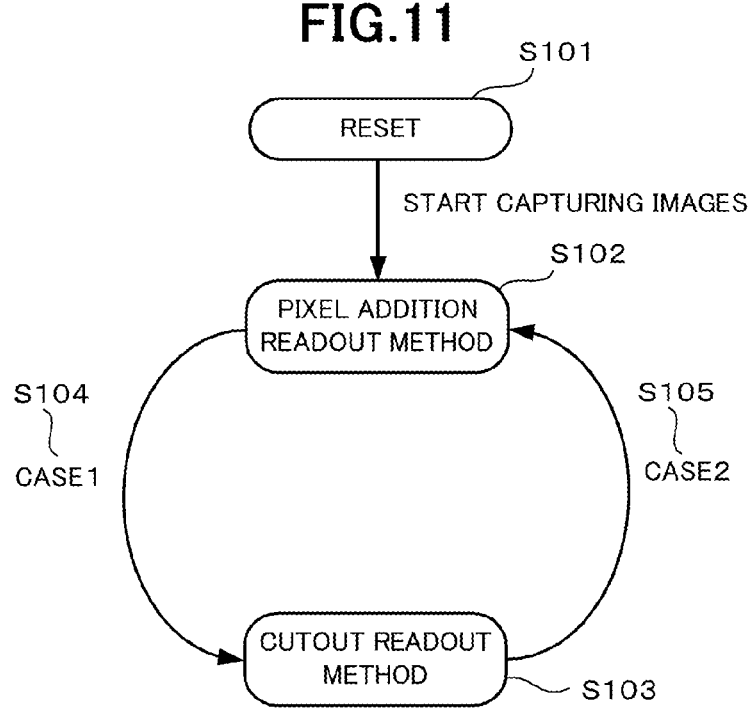
FIG. 11 is a diagram showing a state transition of switching between image-signal readout methods of the imaging device according to Embodiment 2.

FIG. 11 shows a brief illustration of conditions for making transition from a readout method to the other readout method by the imaging device 100 according to this embodiment in case that the readout-method switching controller 52 outputs a switching signal. When starting capturing images in a reset state (S101), the imaging device 100 makes transition to the pixel addition readout method (Step S102). A condition for making transition from the pixel addition readout method (Step S102) to the cutout readout method (Step S103) is when a zoom magnification becomes larger than or equal to a value of the threshold values ZOOM_UP_TH corresponding to the detected lightness (Step S104).

By contrast, a condition for making transition from the cutout readout method (Step S103) to the pixel addition readout method (Step S102) is when the zoom magnification becomes smaller than or equal to a value of the threshold values ZOOM_DOWN_TH corresponding to the detected lightness (Step S105).

Figure 12:
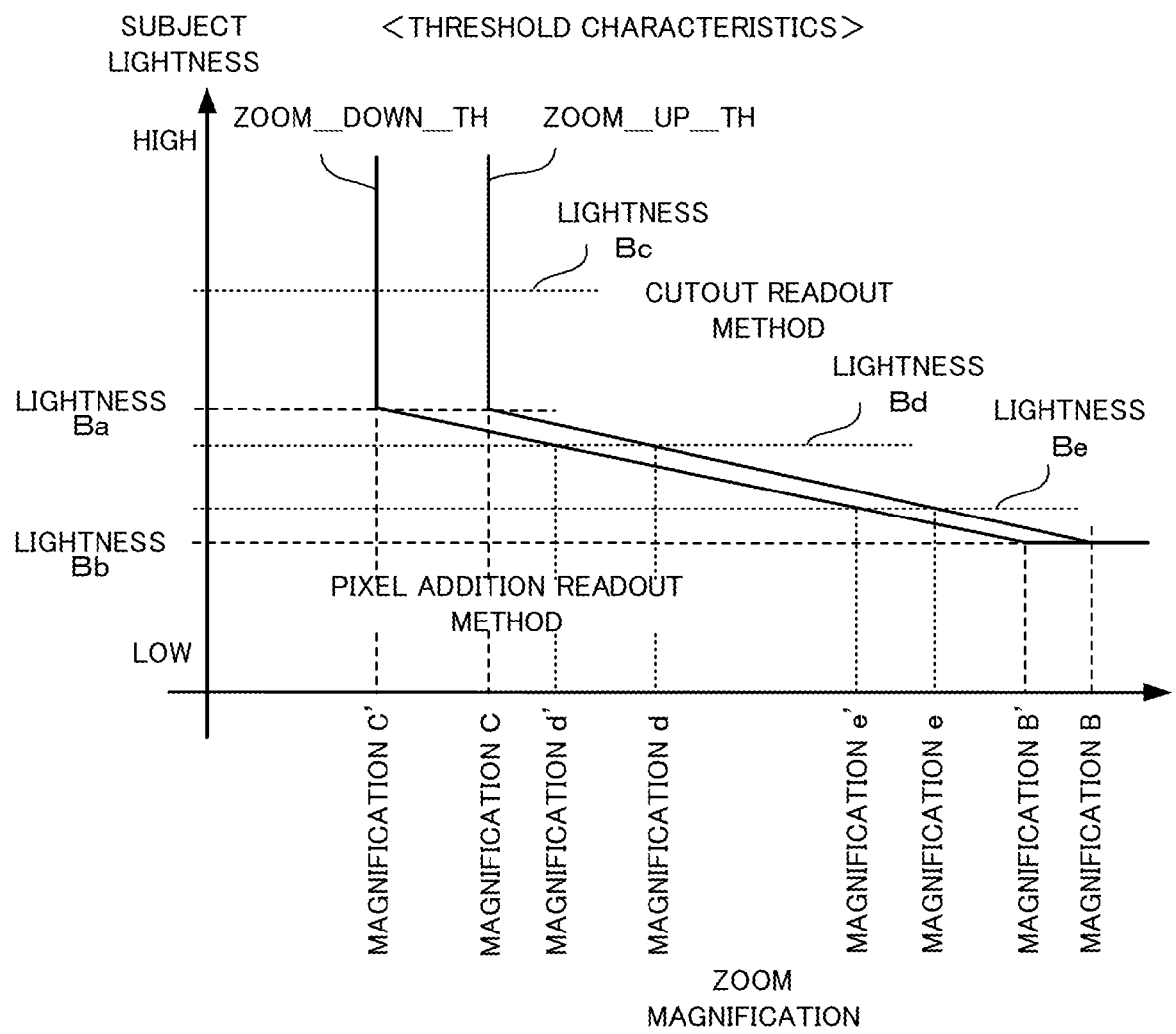
FIG. 12 is a graph showing a modified example of threshold characteristics of the imaging device according to Embodiment 2.
Figure 13:
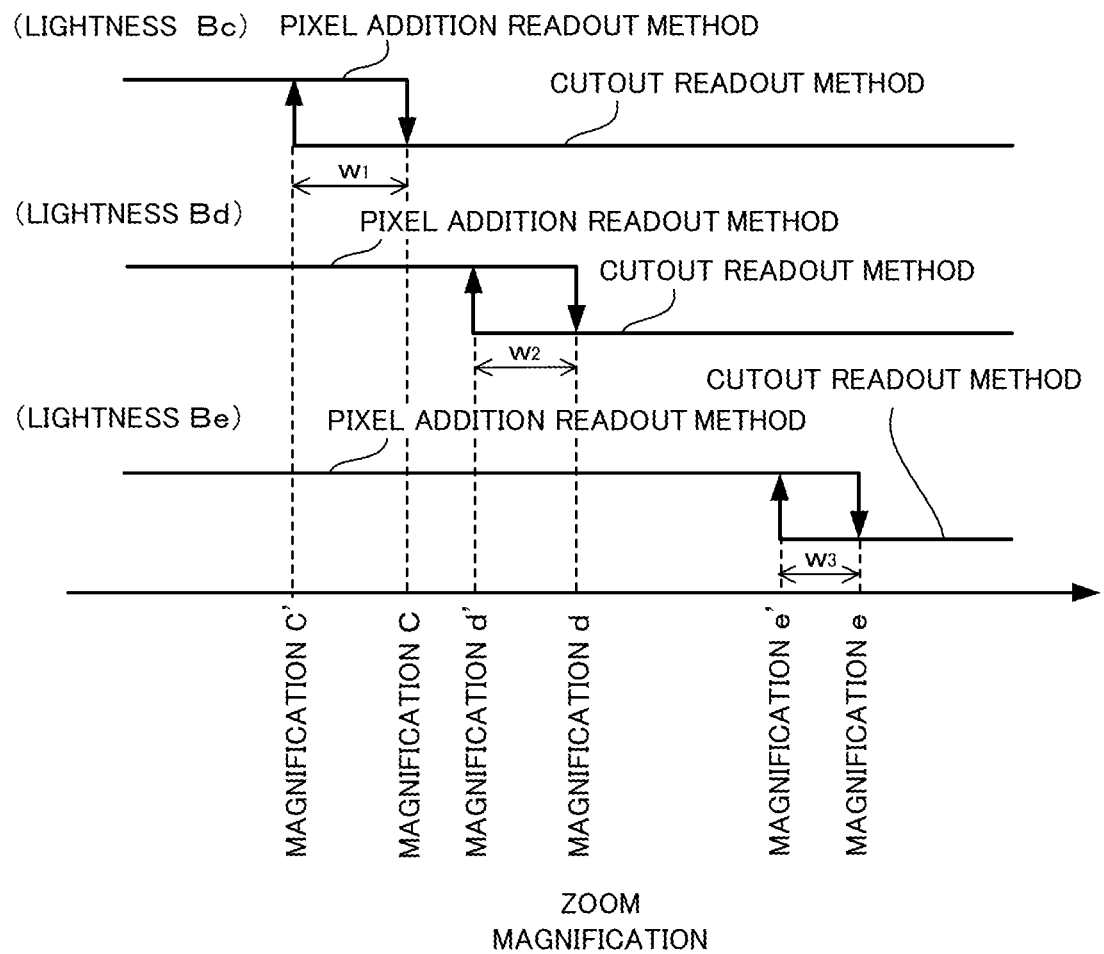
FIG. 13 is a diagram showing hysteresis characteristics of threshold values in the modified example of the threshold characteristics of the imaging device according to Embodiment 2.

The threshold characteristics shown in FIG. 10 may be threshold characteristics shown in FIG. 12. A difference between these two types of threshold characteristics is that, while the threshold values ZOOM_UP_TH and the threshold values ZOOM_DOWN_TH converge at a point of a zoom magnification B and a lightness Bb in FIG. 10, each of the threshold values ZOOM_DOWN_TH is constantly at a smaller zoom-magnification value than a corresponding one of the threshold values ZOOM_UP_TH without converging at a point of the lightness Bb in FIG. 12. With comparing, at the same detected lightness, a threshold value on ZOOM_UP_TH and a threshold value on ZOOM_DOWN_TH in the threshold characteristics shown in FIG. 10, the lower the detected lightness becomes, the smaller a width between two zoom-magnification threshold values having the hysteresis characteristics, that is a difference between zoom magnifications of the two threshold values, becomes. Eventually, when the detected lightness reaches the lightness Bb, the difference becomes 0, and the threshold characteristics shown in FIG. 10 lose the hysteresis characteristics. By contrast, in the threshold characteristics shown in FIG. 12, the threshold values ZOOM_UP_TH and the threshold values ZOOM_DOWN_TH do not cross in the entire range where threshold values are set. Hence, the threshold characteristics in FIG. 12 never lose the hysteresis characteristics. FIG. 13 shows the hysteresis characteristics of threshold values for each of a lightness Bc, a lightness Bd, and a lightness Be in FIG. 12. A width between two threshold values with respect to zoom magnification having the hysteresis characteristics is indicated by $w_1$ for the lightness Bc, $w_2$ for the lightness Bd, and $w_3$ for the lightness Be. Relationship in value between the widths $w_1$ to $w_3$ is adjusted by adjusting difference in gradient of a part in which the threshold value changes to a higher zoom magnification with decrease of the lightness, for each of the types of threshold values ZOOM_UP_TH and the threshold values ZOOM_DOWN_TH.

With the imaging device 100 according to this embodiment, the readout-method switching threshold value for zoom magnification is changed depending on the subject lightness, and also, the threshold values have the hysteresis characteristics. Accordingly, the imaging device 100 according to this embodiment can provide the same advantageous effects as those according to Embodiment 1, and also prevent a situation of being out of control even when zooming-in and zooming-out operations between a wide-angle view and a telescopic view are performed frequently.

Note that, in the threshold characteristics shown in FIG. 10 or FIG. 12, the threshold values ZOOM_UP_TH and the threshold values ZOOM_DOWN_TH have a relationship in which a threshold value on ZOOM_UP_TH is set at a larger value than a threshold value on ZOOM_DOWN_TH at the same subject lightness. However, a threshold value on ZOOM_UP_TH may be set at a smaller value than a threshold value on ZOOM_DOWN_TH. Even in this case, the imaging device 100 can prevent a situation of being out of control when zooming-in and zooming-out operations between a wide-angle view and a telescopic view are performed frequently.

The threshold characteristics of the imaging device 100 shown in FIG. 7 includes characteristics of changing the threshold value according to a change in gain value as shown in FIG. 8. However, the imaging device 100 shown in FIG. 7 may have the hysteresis characteristics as the imaging device 100 shown in FIG. 1 or 6, or the like. Hence, the imaging device 100 shown in FIG. 7 can provide the same advantageous effects as those described in this embodiment.

(Embodiment 3)

Figure 14:
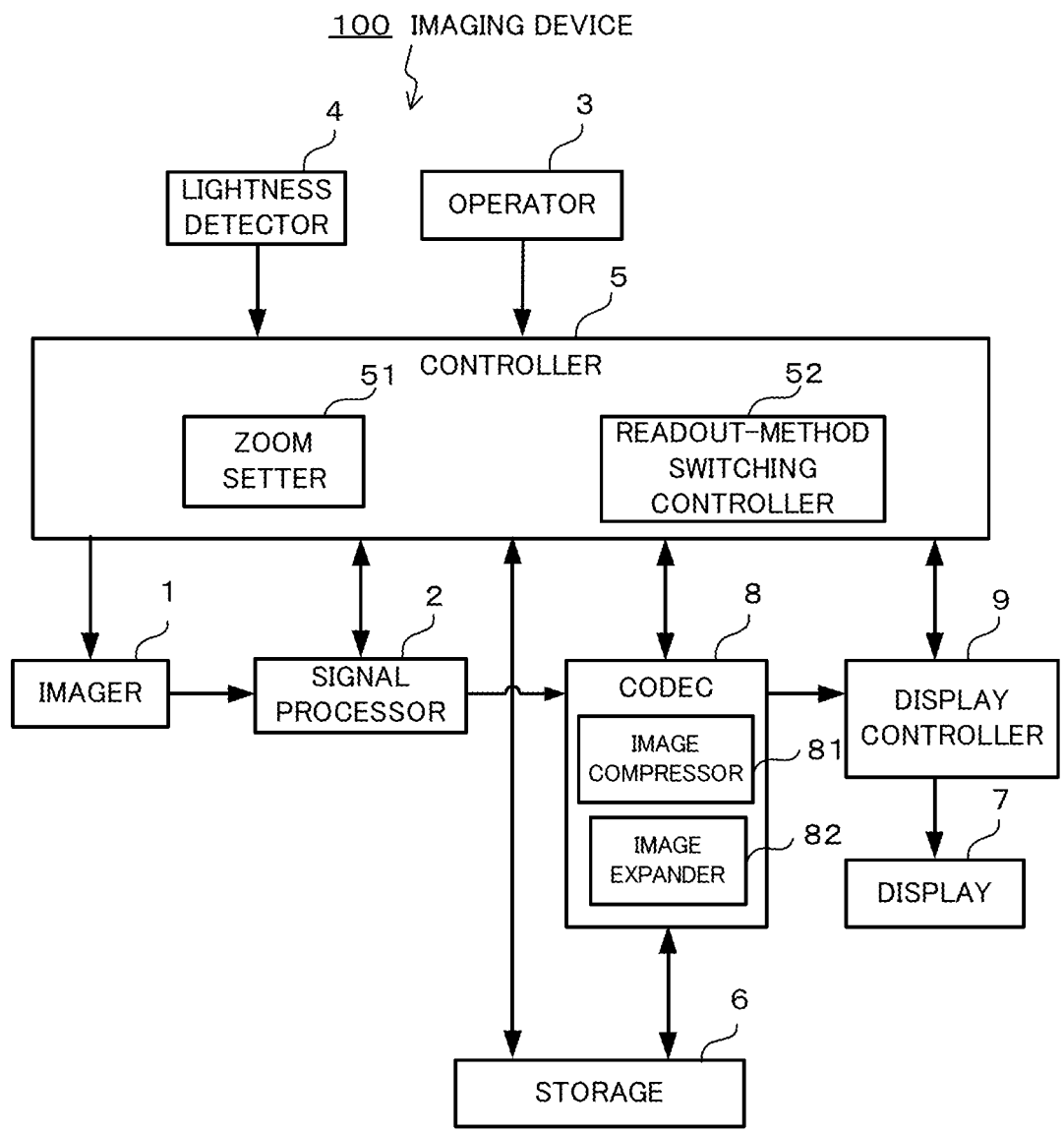
FIG. 14 is a block diagram showing an example of a configuration of an imaging device according to Embodiment 3 of the present invention.

Description will be given for this embodiment. FIG. 14 shows an imaging device 100 according to this embodiment. The imaging device 100 shown in FIG. 14 further includes a codec 8 (including an image compressor 81 and an image expander 82) and a display controller 9 in addition to the imaging device 100 shown in FIG. 1. Moreover, an operator 3 is provided with an image-compression setting switch for specifying an image compression ratio (to be referred to as a compression ratio) for image compression by the codec 8. The other components of the hardware configuration are basically the same as those according to Embodiment 1 shown in FIG. 1, and are hence denoted by the same reference numerals. In addition, overlapping description for the hardware configuration is omitted. The imaging device 100 including the codec 8 having the above configuration is adopted in camera-equipped mobile phones and the like, for example.

Upon operation of the image-compression setting switch by a user, the operator 3 inputs, to the controller 5, a compression ratio for image compression specified by the user.

The image compressor 81 of the codec 8 performs image compression processing on a captured image formed of image signals subjected to high-quality image processing by the signal processor 2, by using a compression ratio specified by a user, and then stores, in the storage 6, a compressed image generated by the image compression processing. Moreover, the image expander 82 of the codec 8 performs image expansion processing on a compressed image read out from the storage 6. The display controller 9 displays, on the display 7, a captured image generated by the image expansion processing.

The threshold characteristics of the imaging device 100 according to this embodiment (here, referred to as threshold characteristics by compression ratio) have threshold values ZOOM_TH as those shown in FIG. 3, for each of a plurality of different compression ratios. FIG. 15 shows an example. The threshold characteristics by compression ratio shown in FIG. 15 for each of three compression ratios a, b, and c (each represented by compression ratio i), for example, have the threshold characteristics indicated by threshold values ZOOM_THa, threshold values ZOOM_THb, and threshold values ZOOM_THc (each represented by ZOOM_THi), respectively. The compression ratio is higher in the order from the compression ratios c, b, to a. The threshold values ZOOM_THi is shifted to a higher zoom magnification for a higher compression ratio i.

The readout-method switching controller 52 extracts threshold values ZOOM_THj corresponding to a compression ratio j which is input by the operator 3, from the threshold values ZOOM_THi exemplified in FIG. 15. A concrete example will be described below. As exemplified in FIG. 16, the threshold characteristics are stored in the threshold characteristics table 71 in such a manner that each compression ratio i is associated with a plurality of lightness values and each of the plurality of lightness values further has one-by-one correspondence with a threshold value (zoom magnification). The readout-method switching controller 52 reads out the threshold characteristics data from the storage 6. Then, the readout-method switching controller 52 extracts, from the read-out threshold characteristics data, a threshold value associated with a lightness that is equal to the detected lightness. When no compression ratio i that is equal to the compression ratio j is included in the threshold characteristics data, the readout-method switching controller 52 extracts two compression ratios i in order from the one having the smallest difference in compression ratio in comparison with the compression ratio j, and reads out the threshold characteristics data of the two compression ratios i. Thereafter, the readout-method switching controller 52 extracts a threshold value associated with a lightness that is equal to the detected lightness, from the threshold characteristics data of the two extracted compression ratios i, and then calculates a threshold value corresponding to the compression ratio j by interpolation or extrapolation calculation for compression ratio. When no lightness that is equal to the detected lightness is included in the threshold characteristics data of the two extracted compression ratios i, the readout-method switching controller 52 calculates a threshold value corresponding to the detected lightness by interpolation or extrapolation calculation for lightness. The subsequent operations by the readout-method switching controller 52 are the same as those described in Embodiment 1.

Operations of the imaging device 100 according to this embodiment are the same as those in Embodiment 1 except for the above-described operations of the readout-method switching controller 52, and hence description for the other operations is omitted.

Note that the lightness detector 4 may be a functional component of the signal processor 2 as shown in FIG. 6. Moreover, as described in the modified example of Embodiment 1, the controller 5 may include the gain setter 53 as a functional component, and convert threshold characteristics of replacing each lightness to a gain value (lightness-gain characteristics) as shown in FIG. 8.

In the imaging device 100 according to this embodiment, when a compression ratio for image compression becomes higher, more information is used for noise content, consequently quality of a compressed image is deteriorated. On the other hand, the imaging device 100 has such threshold characteristics that the higher the compression ratio becomes, the more the readout-method switching threshold value is shifted to a higher zoom magnification, as shown in FIG. 15. Namely, when an image compression ratio for image compression processing increases, the imaging device 100 reads out image signals in the pixel addition readout method to the higher extent of the zoom magnification. Accordingly, when the image compression ratio is high, the imaging device 100 can reduce a proportion of noise content in each image signal, by reading out image signals in the pixel addition readout method, thereby preventing quality of a compressed image from being deteriorated.

Moreover, in this embodiment, each of ZOOM_THa, ZOOM_THb, and ZOOM_THc exemplified in FIG. 15 may have a configuration with hysteresis characteristics. In such a case, a situation in which the imaging device 100 becomes out of control can be prevented even when zooming-in and zooming-out operations between a wide-angle view and a telescopic view are performed frequently.

FIG. 17 is a block diagram showing an example of a hardware configuration, as a computer, of the imaging device 100 according to Embodiments 1 to 3 shown in FIGS. 1, 6, 7, and 14. The imaging device 100 includes a controller 110, a main memory 120, an external storage 130, and an inputter-outputter 140. The main memory 120, the external storage 130, and the inputter-outputter 140 are all connected to the controller 110 via a bus line 150.

The imager 1, the signal processor 2, the operator 3, and the lightness detector 4 in FIGS. 1, 6, 7, and 14 correspond to the inputter-outputter 140. Moreover, the controller 5 in FIGS. 1, 6, 7, and 14 consists of the controller 110 and the main memory 120. The external storage 130 corresponds to the storage 6 in FIGS. 1, 6, 7, and 14, and is used for storing a control program, storing the threshold characteristics data, storing captured images, and the like.

The controller 110 includes a CPU 111. The CPU 111 reads out, to the main memory 120, a control program 200 stored in the external storage 130 and then executes the control program 200, to perform various kinds of processing. Each of the zoom setter 51 and the readout-method switching controller 52 shown in FIGS. 1, 6, 7, and 14, and the gain setter 53 shown in FIG. 7 is a functional component of the controller 5, a function of the functional component being implemented by execution of the control program 200 by the CPU 111.

Note that the imaging process shown in FIG. 5 also shows contents in the program to be executed by the imaging device 100 as a computer.

In the above-described embodiments, a subject lightness is to be an average value of signal quantity of image signals output by the respective imaging elements of the image sensor when capturing an image of a subject. However, a subject lightness is not limited to the average value, and may be any value as long as indicating a value of subject lightness. For example, a subject lightness may be the median or the most frequent value, or the like of signal quantity of image signals output from the respective imaging elements. Further, in the above-described embodiments, an average value of luminance levels is to be used as a subject lightness. However, a subject lightness is not limited to the average value, and may be a value calculated based on luminous intensity, illuminance, or the like.

Furthermore, in each of the above-described embodiments, the program to be executed may be distributed by being stored in computer-readable recording media such as a flexible disc, a CD-ROM (Compact Disc Read-Only Memory), a DVD (Digital Versatile Disc), an MO (Magneto-Optical disc), or the like, and a system for carrying out the above-described processes may be implemented by installing the program.

Furthermore, the program may be stored in a disk drive or the like included in a predetermined server device on a communication network such as the Internet, and may be, for example, downloaded by being superimposed on a carrier.

When the above-described functions are implemented, for example, by being allotted by the OS or in cooperation of the OS and applications, only functions other than those for the OS may be stored in the media for distribution, or may be downloaded, for example.

Some of or all of the above-described embodiments can be described as in the following supplementary notes, but are not limited thereto.

(Supplementary Note 1)
An imaging device comprising:
an imager including an imaging element with a plurality of pixels arranged two-dimensionally, reading out image signals from the plurality of pixels in accordance with a readout method that is set from either a pixel addition readout method for reading out image signals of a plurality of pixels in the imaging element as an image signal corresponding to a single pixel, or a cutout readout method for reading out image signals of all of pixels or part of pixels individually, and then outputting the image signals;
a signal processor outputting a captured image defined by the image signals output by the imager;
a zoom setter setting a zoom magnification based on a zoom signal for specifying the zoom magnification;
a lightness detector detecting a subject lightness indicating brightness of the subject; and
a readout-method switching controller identifying a threshold value corresponding to the subject lightness detected by the lightness detector based on a threshold characteristic that the threshold value changes according to the subject lightness in, and setting the readout method based on a result obtained by comparing the set zoom magnification and the identified threshold value.

(Supplementary Note 2)
The imaging device according to Supplementary Note 1, wherein
the threshold characteristic includes a characteristic that the threshold value increases with decrease in the subject lightness in, and
the readout-method switching controller
identifies the threshold value corresponding to the subject lightness detected by the lightness detector, based on the threshold characteristic,
compares the set zoom magnification and the identified threshold value, and then
sets the pixel addition readout method as the readout method when the set zoom magnification is smaller than the identified threshold value, while setting the cutout readout method as the readout method when the set zoom magnification is larger than the identified threshold value.

(Supplementary Note 3)
The imaging device according to Supplementary Note 1 or 2, wherein
the threshold characteristic includes a characteristic that the threshold value changes according to the subject lightness for each of the readout methods in, and
the readout-method switching controller identifies the threshold value corresponding to the subject lightness detected by the lightness detector, based on the threshold characteristic corresponding to a currently-set readout method, and sets the readout method based on a result obtained by comparing the set zoom magnification and the identified threshold value.

(Supplementary Note 4)
The imaging device according to Supplementary Note 1 or 2, further comprising an image compressor compressing the captured image that is output by the signal processor, based on compression ratio information indicating an image compression ratio, wherein
the threshold characteristic includes a characteristic that the threshold value changes according to the subject lightness for each of the image compression ratios in, and
the readout-method switching controller identifies the threshold value corresponding to the subject lightness detected by the lightness detector, based on the threshold characteristic corresponding to the image compression ratio, and then sets the readout method based on a result obtained by comparing the set zoom magnification and the identified threshold value.

(Supplementary Note 5)
The imaging device according to Supplementary Note 1, further comprising a gain setter setting a gain value corresponding to the subject lightness detected by the lightness detector based on a lightness-gain characteristic that the gain value changes according to the subject lightness in, wherein
the imager amplifies the image signal by multiplying the read-out image signal by the set gain value, and then outputs the amplified image signal,
the threshold characteristic includes the lightness-gain characteristic and a characteristic that the threshold value changes according to the gain value determined based on the lightness-gain characteristic in, and the readout-method switching controller
identifies the threshold value corresponding to the set gain value, based on the threshold characteristic,
compares the set zoom magnification and the identified threshold value, and then
sets the pixel addition readout method as the readout method when the set zoom magnification is smaller than the identified threshold value, while setting the cutout readout method as the readout method when the set zoom magnification is larger than the identified threshold value.

(Supplementary Note 6)

The imaging device according to any one of Supplementary Notes 1 to 5, wherein the lightness detector includes a lightness sensor.

(Supplementary Note 7)

The imaging device according to any one of Supplementary Notes 1 to 5, wherein the lightness detector obtains the subject lightness based on image signals, of the plurality of pixels that are output by the imager.

(Supplementary Note 8)

The imaging device according to Supplementary Note 1, wherein the readout-method switching controller
identifies the threshold value corresponding to the subject lightness detected by the lightness detector, based on the threshold characteristic that the threshold value changes according to the subject lightness in,
compares the set zoom magnification and the identified threshold value,
outputs a switching signal for instructing switching of the readout method, when a relationship in value between the zoom magnification and the threshold value, the relationship is identified by the comparison, is different from a relationship in value between a zoom magnification and the threshold value, the relationship is identified by the comparison previously performed, and then
switches the readout method.

(Supplementary Note 9)

An imaging method comprising:
an imaging step of reading out image signals from a plurality of pixels in accordance with a readout method that is set from either a pixel addition readout method for reading out image signals of the plurality of pixels in an imaging element as an image signal corresponding to a single pixel, or a cutout readout method for reading out image signals of all of pixels or part of pixels individually, and then outputting the image signals;
a signal processing step of outputting a captured image defined by the image signals output in the imaging step;
a zoom setting step of setting a zoom magnification based on a zoom signal for specifying the zoom magnification;
a lightness detection step of detecting a subject lightness indicating brightness of the subject; and
a readout-method switching controlling step of identifying a threshold value corresponding to the subject lightness detected in the lightness detection step based on a threshold characteristic that the threshold value changes according to the subject lightness in, and setting the readout method based on a result obtained by comparing the set zoom magnification and the identified threshold value.

(Supplementary Note 10)

A non-transitory computer-readable recording medium storing a program for causing a computer to execute:
an imaging step of reading out image signals from a plurality of pixels in accordance with a readout method that is set from either a pixel addition readout method for reading out image signals of the plurality of pixels in an imaging element as an image signal corresponding to a single pixel, or a cutout readout method for reading out image signals of all of pixels or part of pixels individually, and then outputting the image signals;
a signal processing step of outputting a captured image defined by the image signals output in the imaging step;
a zoom setting step of setting a zoom magnification based on a zoom signal for specifying the zoom magnification;
a lightness detection step of detecting a subject lightness indicating brightness of the subject; and
a readout-method switching controlling step of identifying a threshold value corresponding to the subject lightness detected in the lightness detection step based on a threshold characteristic that the threshold value changes according to the subject lightness in, and setting the readout method based on a result obtained by comparing the set zoom magnification and the identified threshold value.

It is intended that the present invention be construed as including various embodiments and modifications without departing from the broad principles and scope of the present invention. Moreover, the above-described embodiments are provided for illustration of the present invention, and not to limit the scope of the present invention. Hence, the scope of the present invention is defined by the scope of claims and not the embodiments. Moreover, various modifications made within the scope of claims and the scope of spirit of the present invention equivalent to the scope of claims are considered to be within the scope of the present invention.

The present invention is based on Japanese Patent Application No. 2011-199992 filed on 13 Sep. 2011. The description, the scope of claims, and all the drawings of Japanese Patent Application No. 2011-199992 are incorporated in the present description by reference.

INDUSTRIAL APPLICABILITY

The imaging device, the imaging method, and the program of the present invention are applicable to electronic still cameras, video cameras, camera-equipped mobile phones, and the like comprising an image sensor unit including two-dimensional imaging elements.

REFERENCE SIGNS LIST

1 Imager
2 Signal processor
3 Operator
4 Lightness detector
5 Controller
6 Storage
7 Display
8 Codec
9 Display controller
11 Image sensor
12 Imaging element
51 Zoom setter
52 Readout-method switching controller
53 Gain setter
71 Threshold characteristics table
81 Image compressor
82 Image expander
100 Imaging device

The invention claimed is:
1. An imaging device comprising:
an imager including an imaging element with a plurality of pixels arranged two-dimensionally, reading out image signals from the plurality of pixels in accordance with a readout method that is set from either a pixel addition readout method for reading out image signals of a plurality of pixels in the imaging element as an image signal corresponding to a single pixel, or a cutout readout method for reading out image signals of all of pixels or part of pixels individually, and then outputting the image signals;

a signal processor outputting a captured image defined by the image signals output by the imager;

a zoom setter setting a zoom magnification based on a zoom signal for specifying the zoom magnification;

a lightness detector detecting a subject lightness indicating brightness of the subject; and a readout-method switching controller identifying a threshold value corresponding to the subject lightness detected by the lightness detector based on a threshold characteristic that the threshold value changes according to the subject lightness, and setting the readout method based on a result obtained by comparing the set zoom magnification and the identified threshold value.

2. The imaging device according to claim 1, wherein the threshold characteristic includes a characteristic that the threshold value increases with decrease in the subject lightness, and the readout-method switching controller
identifies the threshold value corresponding to the subject lightness detected by the lightness detector, based on the threshold characteristic,
compares the set zoom magnification and the identified threshold value, and then
sets the pixel addition readout method as the readout method when the set zoom magnification is smaller than the identified threshold value, while setting the cutout readout method as the readout method when the set zoom magnification is larger than the identified threshold value.

3. The imaging device according to claim 1, wherein
the threshold characteristic includes a characteristic that the threshold value changes according to the subject lightness for each of the readout methods, and
the readout-method switching controller identifies the threshold value corresponding to the subject lightness detected by the lightness detector, based on the threshold characteristic corresponding to a currently-set readout method, and sets the readout method based on a result obtained by comparing the set zoom magnification and the identified threshold value.

4. The imaging device according to claim 1, further comprising an image compressor compressing the captured image that is output by the signal processor, based on compression ratio information indicating an image compression ratio, wherein
the threshold characteristic includes a characteristic that the threshold value changes according to the subject lightness for each of the image compression ratios, and
the readout-method switching controller identifies the threshold value corresponding to the subject lightness detected by the lightness detector, based on the threshold characteristic corresponding to the image compression ratio, and then sets the readout method based on a result obtained by comparing the set zoom magnification and the identified threshold value.

5. The imaging device according to claim 1, further comprising a gain setter setting a gain value corresponding to the subject lightness detected by the lightness detector based on a lightness-gain characteristic that the gain value changes according to the subject lightness, wherein the imager amplifies the image signal by multiplying the read-out image signal by the set gain value, and then outputs the amplified image signal, the threshold characteristic includes the lightness-gain characteristic and a characteristic that the threshold value changes according to the gain value determined based on the lightness-gain characteristic, and the readout-method switching controller
identifies the threshold value corresponding to the set gain value, based on the threshold characteristic,
compares the set zoom magnification and the identified threshold value, and then
sets the pixel addition readout method as the readout method when the set zoom magnification is smaller than the identified threshold value, while setting the cutout readout method as the readout method when the set zoom magnification is larger than the identified threshold value.

6. The imaging device according to claim 1, wherein the lightness detector includes a lightness sensor.

7. The imaging device according to claim 1, wherein the lightness detector obtains the subject lightness based on image signals of the plurality of pixels that are output by the imager.

8. The imaging device according to claim 1, wherein the readout-method switching controller
identifies the threshold value corresponding to the subject lightness detected by the lightness detector, based on the threshold characteristic that the threshold value changes according to the subject lightness,
compares the set zoom magnification and the identified threshold value,
outputs a switching signal for instructing switching of the readout method, when a relationship value between the zoom magnification and the threshold value, the relationship is identified by the comparison, is different from a relationship value between the zoom magnification and the threshold value, the relationship is identified by the comparison previously performed, and then
switches the readout method.

9. An imaging method comprising:
an imaging step of reading out image signals from a plurality of pixels in accordance with a readout method that is set from either a pixel addition readout method for reading out image signals of the plurality of pixels in an imaging element as an image signal corresponding to a single pixel, or a cutout readout method for reading out image signals of all of pixels or part of pixels individually, and then outputting the image signals;
a signal processing step of outputting a captured image defined by the image signals output in the imaging step;
a zoom setting step of setting a zoom magnification based on a zoom signal for specifying the zoom magnification;
a lightness detection step of detecting a subject lightness indicating brightness of the subject; and
a readout-method switching controlling step of identifying a threshold value corresponding to the subject lightness detected in the lightness detection step based on a threshold characteristic that the threshold value changes according to the subject lightness, and setting the readout method based on a result obtained by comparing the set zoom magnification and the identified threshold value.

10. A non-transitory computer-readable recording medium storing a program for causing a computer to execute:
an imaging step of reading out image signals from a plurality of pixels in accordance with a readout method that is set from either a pixel addition readout method for reading out image signals of the plurality of pixels in an imaging element as an image signal corresponding to a single pixel, or a cutout readout method for reading out image signals of all of pixels or part of pixels individually, and then outputting the image signals;

a signal processing step of outputting a captured image defined by the image signals output in the imaging step;

a zoom setting step of setting a zoom magnification based on a zoom signal for specifying the zoom magnification;

a lightness detection step of detecting a subject lightness indicating brightness of the subject; and a readout-method switching controlling step of identifying a threshold value corresponding to the subject lightness detected in the lightness detection step based on a threshold characteristic that the threshold value changes according to the subject lightness, and setting the readout method based on a result obtained by comparing the set zoom magnification and the identified threshold value.

* * * * *